(12) United States Patent
Samuilov et al.

(10) Patent No.: US 11,127,538 B2
(45) Date of Patent: Sep. 21, 2021

(54) MULTI-CELL MULTI-LAYER HIGH VOLTAGE SUPERCAPACITOR APPARATUS INCLUDING GRAPHENE ELECTRODES

(71) Applicant: The Research Foundation for The State University of New York, Albany, NY (US)

(72) Inventors: Vladimir Samuilov, Sound Beach, NY (US); Vyacheslav Solovyov, Stony Brook, NY (US); Zemfira Abutalibova, South Setauket, NY (US)

(73) Assignee: THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 168 days.

(21) Appl. No.: 16/486,356

(22) PCT Filed: Feb. 20, 2018

(86) PCT No.: PCT/US2018/018765
§ 371 (c)(1),
(2) Date: Aug. 15, 2019

(87) PCT Pub. No.: WO2018/152515
PCT Pub. Date: Aug. 23, 2018

(65) Prior Publication Data
US 2020/0006013 A1  Jan. 2, 2020

Related U.S. Application Data

(60) Provisional application No. 62/461,035, filed on Feb. 20, 2017.

(51) Int. Cl.
*H01G 11/10* (2013.01)
*H01G 11/28* (2013.01)
(Continued)

(52) U.S. Cl.
CPC ............ *H01G 11/10* (2013.01); *H01G 11/28* (2013.01); *H01G 11/36* (2013.01); *H01G 11/76* (2013.01); *H01G 11/78* (2013.01)

(58) Field of Classification Search
CPC ........ H01G 11/10; H01G 11/28; H01G 11/36; H01G 11/76; H01G 11/78; Y02E 60/13; B82Y 30/00
See application file for complete search history.

(56) References Cited

U.S. PATENT DOCUMENTS 5,012,385 A * 4/1991 Kurabayashi ............ H01G 9/08
                                                  361/328
8,411,413 B2 * 4/2013 Eilertsen ................ H01G 11/28
                                                  361/502

(Continued)

FOREIGN PATENT DOCUMENTS

| CN | 106409521 A | 2/2017 |
| KR | 101564512 B1 | 10/2015 |
| WO | 2011/077109 A1 | 6/2011 |

OTHER PUBLICATIONS

Meryl D. Stoller and Rodney S. Ruoff, "Best practice methods for determining an electrode material's performance forultracapacitors", Received May 12, 2010, Accepted Jun. 22, 2010 DOI: 10.1039/c0ee00074d Energy Environ. Sci., 2010, 3, pp. 1294-1301 This journal is © The Royal Society of Chemistry 2010.

(Continued)

*Primary Examiner* — Nathan Milakovich
(74) *Attorney, Agent, or Firm* — Cowan, Liebowitz & Latman, P.C.

(57) ABSTRACT

A supercapacitor apparatus within a sealed housing to provide a high-voltage EDLC energy storage unit includes cells stacked on one another, with each cell having a set of supercapacitors that are interconnected within the apparatus in a parallel-series configuration to provide an internally (Continued)

balanced energy storage unit that is capable of stand-off voltages of 10 volts or higher. The energy storage unit does not require balancing resistors or more complicated external balancing circuitry. The electrodes of the supercapacitors are comprised of carbon nanotubes and graphene nanoplatelets.

21 Claims, 30 Drawing Sheets

(51) Int. Cl.
    *H01G 11/36*     (2013.01)
    *H01G 11/76*     (2013.01)
    *H01G 11/78*     (2013.01)

(56) References Cited

U.S. PATENT DOCUMENTS

| | | | |
|---|---|---|---|
| 9,245,693 B2 * | 1/2016 | Eilertsen | H01G 11/24 |
| 9,871,236 B2 * | 1/2018 | Lampe-Onnerud | H01M 50/579 |
| 10,741,336 B2 * | 8/2020 | Shim | H01G 11/76 |
| 10,784,053 B2 * | 9/2020 | Dayrell | H01G 11/10 |
| 2009/0080141 A1 * | 3/2009 | Eilertsen | H01G 11/32 361/502 |
| 2013/0286544 A1 * | 10/2013 | Azais | H01G 11/22 361/502 |
| 2015/0306698 A1 * | 10/2015 | Astle | B23K 11/36 219/113 |
| 2016/0133395 A1 | 5/2016 | Yoo et al. | |
| 2016/0284481 A1 | 9/2016 | Duan et al. | |

OTHER PUBLICATIONS

Volker Presser, Min Heon, and Yury Gogotsi, "Carbide-Derived Carbons—From Porous Networks to Nanotubes and Graphene", Adv. Funct. Mater. 2011, 21, pp. 810-833, www.afm-journal.de www.MaterialsViews.com.

Volker Presser, Christopher R. Dennison, Jonathan Campos, Kevin W. Knehr, Emin C. Kumbur, and Yury Gogotsi, "The Electrochemical Flow Capacitor: A New Concept for Rapid Energy Storage and Recovery" Adv. Energy Mater. 2012, 2, pp. 895-902, www.advenergymat.de.

P. Simon and Y. Gogotsi, "Capacitive Energy Storage in Nanostructured Carbon Electrolyte Systems" Accounts of Chemical Research pp. 1094-1103 '2013' vol. 46, No. 5 Published on the Web Jun. 6, 2012, www.pubs.acs.org/accounts.

Tao Chen and Liming Dai, "Carbon nanomaterials for high-performance supercapacitors", Materials Today vol. 16, Nos. 7/8 Jul./Aug. 2013, 9 Pgs.

Majid Beidaghi and Yury Gogotsi, "Capacitive energy storage in micro-scale devices: recent advances in design and fabrication of micro-supercapacitors", Energy Environ. Sci., 2014, 7, pp. 867-884.

Katherine L. Van Aken, Majid Beidaghi, and Yury Gogotsi, "Formulation of Ionic-Liquid Electrolyte to Expand the Voltage Window of Supercapacitors", Angew. Chem. 2015, 127, 4 pp. 4888-4891.

The above US Publications and foreign patent documents were cited the International Search Report dated Jun. 14, 2018 in PCT/US2018/018765.

* cited by examiner

MULTI-CELL MULTI-LAYER HIGH VOLTAGE SUPERCAPACITOR APPARATUS INCLUDING GRAPHENE ELECTRODES

REFERENCE TO PRIORITY APPLICATION

This application claims priority to U.S. Provisional Patent Application No. 62/461,035, filed Feb. 20, 2017, the disclosure of which is incorporated herein by reference.

BACKGROUND OF THE INVENTION

1. Field of the Invention

The present application relates to supercapacitors and, in particular, to a multi-cell multi-layer high voltage supercapacitor apparatus including graphene electrodes.

2. Related Art

Supercapacitors, also known as electric double layer capacitors (EDLCs), or ultracapacitors, are promising energy storage devices. Due to their fast charge-discharge characteristics, low equivalent series resistance, long cycle life, and wide operating temperatures, supercapacitors are finding application in transportation, industrial and grid energy storage. There is growing demand for capacitive energy storage systems with high power and energy densities. Currently, individual supercapacitor units have a low stand-off voltage, generally 3 volts or less. In order to increase operation voltage to a practical level, such as 10 volts, 20 volts or greater, for use in certain applications, EDLCs can be connected in a series of stacks. However, series-connected EDLCs need to be interconnected and balanced with an external electronic circuit, which undesirably results in a bulky and expensive energy storage device.

OBJECTS AND SUMMARY OF THE INVENTION

In view of the foregoing, it is an object of the present invention to provide a supercapacitor apparatus with multiple supercapacitors that does not suffer one or more of the shortcomings of currently available series-connected EDLCs.

It is a further object of the present invention to provide a supercapacitor apparatus with internal balancing, that is, does not need an external balancing circuit.

It is another object of the present invention to provide a sealed high-voltage EDLC energy storage unit.

It is a yet another object of the present invention to provide an optimal electrode-electrolyte combination for low leakage losses within a supercapacitor apparatus.

It is yet a further object of the present invention to provide a high energy, high voltage, low loss supercapacitor.

It is yet an additional object of the present invention to provide an advanced electrochemical power source suitable for regenerative braking and micro-grid VAR applications.

Other objects of the present invention are discussed herein and/or will become readily apparent to those of ordinary skill in the art from the detailed description of the invention.

To achieve one or more of the foregoing and/or other objects, the present invention, in accordance with certain embodiments of the invention, is a supercapacitor apparatus that comprises a first cell that includes at least first and second supercapacitors that have a common electrode (or whose first electrodes are otherwise electrically coupled), and a second cell that includes at least first and second pairs of supercapacitors in which one of the supercapacitors of the first pair of the second cell and one of the supercapacitors of the second pair of the second cell have a common electrode. The first cell is stacked on the second cell and interconnected in a manner in which the first pair of supercapacitors of the second cell and the first supercapacitor of the first cell have a common electrode, and the second pair of supercapacitors of the second cell and the second supercapacitor of the first cell have a common electrode.

In each embodiment and variation thereof, the term "common electrode" broadly refers to a shared electrode or to two or more electrodes (of each associated supercapacitor) that are electrically connected.

As an aspect of the invention, each of the supercapacitors of the first pair of the second cell are disposed adjacent to one another, each of the supercapacitors of the second pair of the second cell are disposed adjacent to one another, and the supercapacitor of the first pair of the second cell and the supercapacitor of the second pair of the second cell having a common electrode are adjacent to each other.

As a further aspect of the invention, the first cell includes third and fourth supercapacitors in which the third supercapacitor of the first cell has an electrode in common with the common electrode of the first pair of supercapacitors of the second cell and the first supercapacitor of the first cell, and the fourth supercapacitor of the first cell has an electrode in common with the common electrode of the second pair of supercapacitors of the second cell and the second supercapacitor of the first cell.

As another aspect of the invention, the first cell includes a second pair of supercapacitors disposed adjacent to the first pair of supercapacitors of the first cell, the second pair of supercapacitors of the first cell has a common electrode, and one of the supercapacitors of the second pair of the first cell has an electrode in common with the common electrode of the second pair of supercapacitors of the second cell and the second supercapacitor of the first cell.

As yet a further aspect of the invention, the supercapacitor apparatus further comprises a third cell that includes at least first and second supercapacitors, in which the first and second supercapacitors of the third cell represent a pair of supercapacitors and have a common electrode that is in common with the common electrode of the supercapacitor of the first pair of the second cell and the supercapacitor of the second pair of the second cell.

As yet an additional feature of this aspect, the supercapacitors of the third cell are intra-connected in a manner identical to the intra-connection of the supercapacitor of the first cell.

Still as yet another aspect of the invention, the supercapacitors of the first cell and the supercapacitors of the second cell are interconnected in a mirror configuration.

Still as yet a further aspect of the invention, the supercapacitor apparatus can have yet additional cells and each of the cells have multiple pairs of supercapacitors that are interconnected to supercapacitors within the same respective cell and to supercapacitors in adjacent cells in the above-stated fashion (i.e., in the herein-described parallel-series configuration).

As a further aspect of the invention, the supercapacitor apparatus, during operation, is internally balanced and does not require active, external balancing.

As another aspect of the invention, the supercapacitor apparatus does not include balancing resistors.

As yet a further aspect of the invention, the supercapacitor apparatus further comprises at least third and fourth cells each including a plurality of supercapacitors, in which the supercapacitors of the third cell are interconnected with the supercapacitors of the second cell, and the supercapacitors of the fourth cell are interconnected with the supercapacitors of the third cell, and wherein the interconnections are configured to provide a stand-off voltage of the supercapacitor apparatus of at least 10 volts.

As yet an additional aspect of the invention, the supercapacitor apparatus includes at least eight cells, and each of the cells has a plurality of supercapacitors, and each cell is interconnected with an adjacent cell in a manner configured to provide a stand-off voltage of the supercapacitor apparatus of at least 20 volts.

As yet a further aspect of the invention, each of the electrodes of the supercapacitors is a nano-carbon composite of graphene platelets with carbon nanotubes.

As yet another aspect of the invention, each of the electrodes of the supercapacitors comprises graphene nanostructures disposed on a conductive metal foil.

As a feature of this aspect, the graphene nanostructures comprise at least one of carbon nanotubes and graphene nanoplatelets and combinations thereof.

As a further feature of this feature, each of the electrodes of the supercapacitors comprises carbon nanotubes and graphene nanoplatelets at a ratio of 50:50.

As a further aspect of the invention, each of the electrodes of the supercapacitors are adapted to exhibit a capacitance density of at least 200 F/g.

As yet another aspect of the invention, the supercapacitor apparatus further comprises a housing and each of the cells are sealed within the housing to provide a sealed high-voltage supercapacitor energy storage unit with internal balancing.

As a feature of this aspect, the housing of the supercapacitor apparatus includes only positive and negative terminals for external connection to the cells sealed within the housing. Accordingly, there are no terminals to (or other means to externally connect with) all of the superconductors and/or all of the cells within the housing.

The present invention, in accordance with certain embodiments of the invention, is a supercapacitor apparatus that comprises a plurality of cells stacked on one another, and each of the cells includes a plurality of supercapacitors, and the cells and the supercapacitors therein are in a parallel-series configuration to provide an internally balanced supercapacitor apparatus with a stand-off voltage of at least 10 volts.

As an aspect of the invention, the supercapacitor apparatus is configured to not require balancing resistors or external balancing circuitry to remain balanced during operation.

As an aspect of the invention, each of the electrodes of the supercapacitors comprises graphene nanostructures disposed on a conductive metal foil.

The present invention, in accordance with certain embodiments of the invention, is a supercapacitor apparatus comprising a plurality of cells, each of the cells having a plurality of pairs of supercapacitors, each of the supercapacitors with each of the cells interconnected to one or more supercapacitors within the same respective cell and to one or more supercapacitors in one or more adjacent cells, the interconnection of the supercapacitors representing a parallel-series configuration.

As an aspect of this embodiment, the supercapacitors interconnected in the parallel-series configuration is configured to provide an internally balanced supercapacitor apparatus having a stand-off voltage of at least 10 volts.

These and other embodiments, aspects and features of the present invention are described in the following detailed description. Additional objects, advantages and features of the present invention will become readily apparent to those of ordinary skill in the art from the following detailed description of the invention.

BRIEF DESCRIPTION OF THE DRAWINGS

The above and other objects, features and advantages of certain embodiments of the present invention will be more apparent from the following detailed description taken in conjunction with the accompanying drawings, in which:

FIGS. 6A and 6B are schematic illustrations showing the parallel-series configuration of the supercapacitor apparatus in accordance with the present invention, and in which FIG. 6B is a duplicate of FIG. 6A but without reference numbering;

FIGS. 7A and 7B are a circuit diagram showing the parallel-series configuration of the supercapacitor apparatus in accordance with the present invention, and in which FIG. 7B is a duplicate of FIG. 7A but without reference numbering;

DETAILED DESCRIPTION OF INVENTION

Figure 1A:
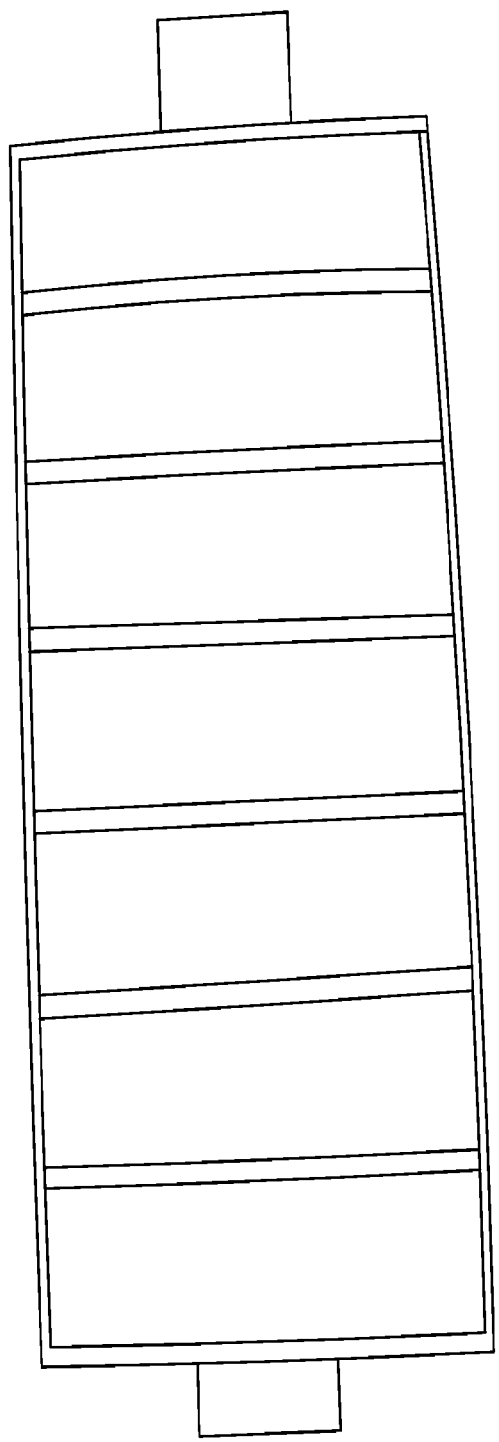
FIG. 1A is a photograph of an exemplary supercapacitor apparatus in accordance with the present invention.

The following detailed description of embodiments of the invention will be made in reference to the accompanying drawings. In describing the invention, explanation about related functions or constructions known in the art are omitted for the sake of clearness in understanding the concept of the invention and to avoid obscuring the invention with unnecessary detail.

The present invention pertains to a multi-cell multi-layer high voltage supercapacitor apparatus, that includes graphene platelet electrodes, configured to operate at a voltage exceeding the voltage of each individual electrochemical double layer capacitor (EDLC) unit incorporated therein. As explained in further detail herein, the apparatus is assembled by the herein-described "parallel-series connection" (also referred to herein as "parallel-series configuration") of carbon-coated electrodes that are either stacked or rolled in a compact package. The electrodes are coated with gel-like electrolyte and separated with a permeable membrane. Due to statistical averaging of electrical properties of the individual EDLC sub-cells, the apparatus does not require active, external balancing. Details of the construction, design, benefits and other characteristics of the various embodiments of the present invention are described below.

There is a growing demand for capacitive energy storage systems with high power and energy densities. EDLCs are increasingly used as a source of high power. One of the issues with the conventional EDLC design is low breakdown voltage of the electrolyte. This limits the maximum voltage of an EDLC to approximately 3 volts in, for example, a solution of $TEABF_4$ salt in acetonitrile. In order to increase the voltage to a practical level, several units are connected in series, which in theory increases the voltage of an assembly proportionally to the number of units. Due to variability of individual units, the series-connected apparatus is balanced. Conventionally, external circuitry provides the balancing by re-distributing charges between the interconnected units. The external circuitry requires complicated electronics and resistors that disadvantageously increases discharge current of the capacitor, as well as complicate the overall design.

Conventional EDLC packaging follows the design developed for electrolytic capacitors. See, for example, U.S. Pat. No. 3,622,843, which is incorporated herein by reference. Foil electrodes are separated by a permeable membrane and are either stacked or rolled in a cylindrical shape. Such designs of series-connected units require external electrical connection to a sub-cell in order to balance the stack. Some of these designs utilize an internal series connection between the units, however the device still has electrical leads to each individual unit so that the balancing circuit can be connected.

Despite the above-noted shortcomings of EDLCs, EDLCs offer multiple advantages. Upon charging, an electric double layer forms at electrode surfaces with atomic scale charge separations that create large charge capacities. This rapid transfer of ions over short distances (of several nanometers) offers high power density and long life-cycles. Due to their fast charge-discharge characteristics, low equivalent series resistance (ERS), long cycle life, and wide operating temperatures, EDLCs find applications in many areas, including transportation, industrial and grid energy storage, as mentioned earlier, as well as in consumer electronics. The rapidly growing demand for capacitive energy storage systems for applications such as self-powered micro and nanosystems, portable electronic devices, and large-scale stationary applications has inspired much research in an effort to develop supercapacitors that can provide high power and energy densities. However, despite the attention received by EDLCs and research into this area, commercial application of EDLCs still is significantly limited.

Various articles relating to supercapacitors include: (1) Simon, P.; Gogotsi, Y. Capacitive Energy Storage in Nanostructured Carbon Electrolyte Systems. Acc. Chem. Res. 2012, 46, 1094-1103; (2) Tao Chen, Liming Dai. Carbon Nanomaterials for High Performance Supercapacitors. Materials Today, 2013, 16, 7/8, 272-280; (3) Presser, V.; Heon, M.; Gogotsi, Y. Carbide-Derived Carbons—From Porous Networks to Nanotubes and Graphene. Adv. Funct. Mater. 2011, 21, 810-833; (4) Van Aken, K. L.; Beidaghi, M.; Gogotsi, Y. Formulation of Ionic-Liquid Electrolyte to Expand the Voltage Window of Supercapacitors. Angew. Chemie 2015, 127, 4888-4891; (5) Presser, V.; Dennison, C. R.; Campos, J.; Knehr, K. W.; Kumbur, E. C.; Gogotsi, Y. The Electrochemical Flow Capacitor: A New Concept for Rapid Energy Storage and Recovery. Adv. Energy Mater. 2012, 2, 895-902; (6) Beidaghi, M.; Gogotsi, Y. Capacitive Energy Storage in Micro-Scale Devices: Recent Advances in Design and Fabrication of Micro-Supercapacitors. Energy Environ. Sci. 2014, 7, 867; (7) Meryl D. Stoller, Dodney S. Ryoff. Best Practice Methods for Determining an Electrode Material's Performance for Ultracapacitors. Energy and Environmental Science, 2010, 3, 1294-1301, all of which are incorporated herein by reference.

The present invention represents a revolutionary advancement in energy storage. As will be appreciated from the description herein, each of the embodiments of the multi-cell multi-layer high voltage supercapacitor apparatus of the present invention, and variations thereof, provide one or more of the following features and advances:

(1) a sealed high-voltage EDLC energy storage unit;
(2) EDLCs that are internally balanced, that is, they do not require an external circuit for balancing;
(3) EDLCs with optimal electrode-electrolyte combination for low leakage losses;
(4) EDLCs that are high energy, high voltage, with low leakage loss;

and other features, advances and benefits as described herein.

In general terms, the present invention is a multi-cell multi-layer high voltage supercapacitor apparatus (sometimes referred to herein, for convenience, as simply "the supercapacitor apparatus"), provided as a sealed high-voltage EDLC energy storage unit, that is configured to be internally balanced. In certain embodiments, the supercapacitors' electrodes are a nano-carbon composite of graphene platelets with carbon nanotubes. The electrodes are reproducible, exhibiting a high capacitance density about or more than 200 F/g and exhibit low leakage. In certain embodiments, the supercapacitor apparatus employs internal multi-layer network balancing. In certain embodiments, the supercapacitor apparatus enables high stand-off voltage and passive balancing of the stack. In such embodiments, the balancing is realized by the charge transfer between the units through the parallel-series connection. The supercapacitor apparatus can be packaged as in a roll of stacked electrodes or as a flat stack.

In certain embodiments, the multi-cell multi-layer high voltage supercapacitor apparatus provides a bipolar EDLC device which is formed by parallel-series connections of individual cells, each cell having the stand-off voltage limited by breakdown of the electrolyte, e.g., less than 3 volts. The cells, in certain embodiments, are formed by deposition of a carbon solution on a conductive metal foil.

In a particular embodiment, 50 micron thick copper foil is used as the conductive support for the electrode. In such embodiment, a solution of graphene nanoplatelets is deposited on both sides of the foil by drop-casting coating. The graphene is dissolved in butyl-acetate solution, and up to 5% of Kynar polymer is added to the solution in order to bind the graphene platelets. The coatings are then dried in air at a temperature of approximately 200° C. The electrodes are separated by a separator, which in certain embodiments, includes a Celgard® porous polymer membrane.

In the supercapacitor apparatus of the present invention, voltages well beyond 3 volts are possible, for example, 10 volts, 20 volts and 30 volts, and well as other similar voltages as desired. A few exemplary applications of the supercapacitor apparatus of the present invention include regenerative braking and micro-grid VAR systems.

Figure 1B:
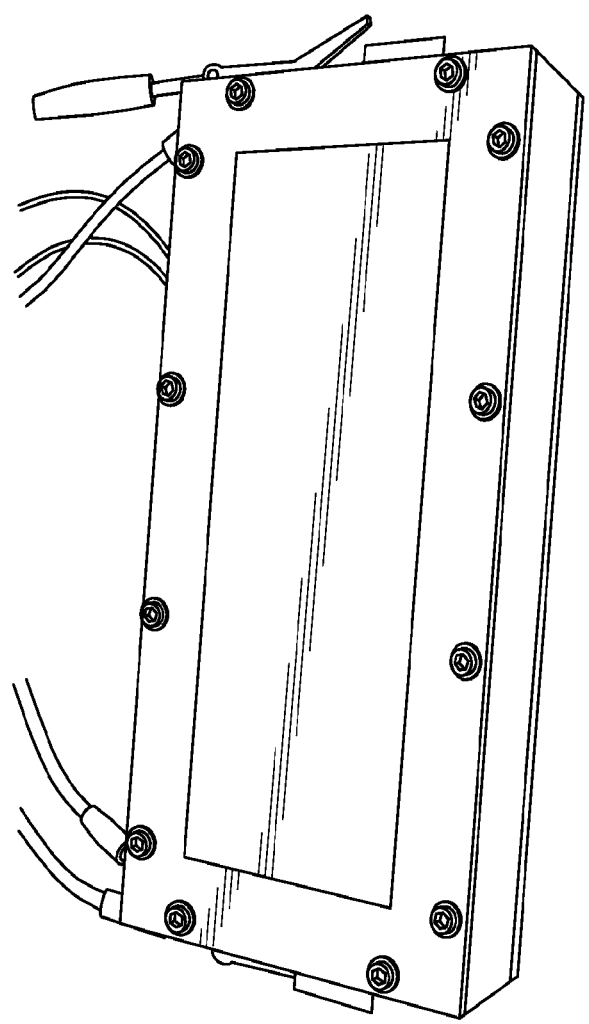
FIG. 1B is a photograph of an exemplary housing of the inventive supercapacitor apparatus.

Turning now to the figures, FIG. 1A thereof is a photograph of an exemplary supercapacitor apparatus in accordance with the present invention. FIG. 1B is a photograph of an exemplary housing of the inventive supercapacitor apparatus.

Figure 2A:
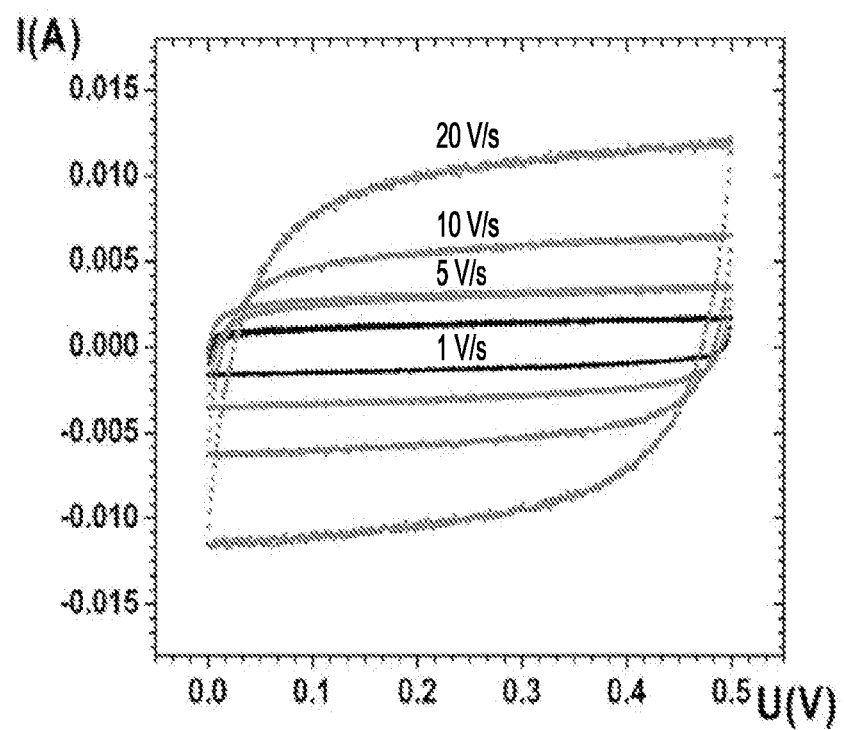
FIG. 2A graphically shows voltammetric curves at various scan rates of the supercapacitor apparatus of the present invention.
Figure 2B:
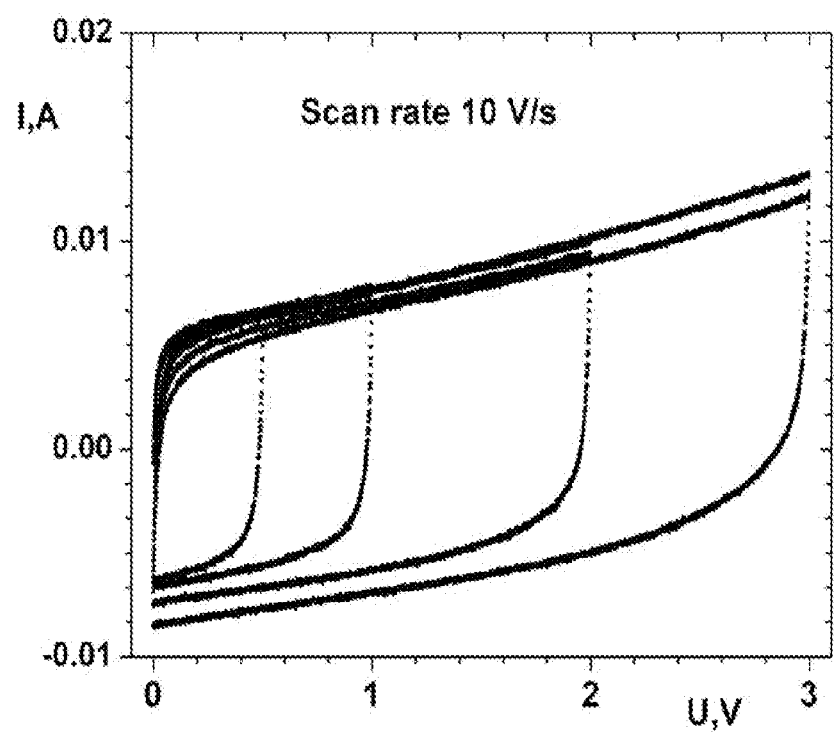
FIG. 2B shows voltammetric curves at a high scan rate 10 V/s at various voltage limits of the supercapacitor apparatus of the present invention.
Figure 2C:
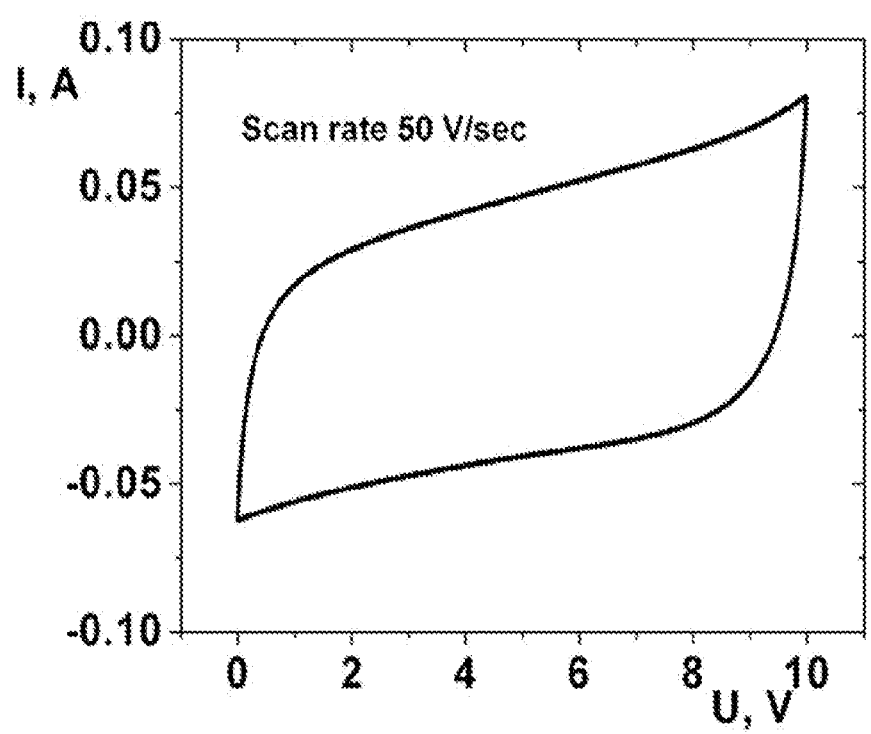
FIG. 2C shows a voltammetric curve at scan rate 50 V/s with a 10 V limit in accordance with the present invention.
Figure 2D:
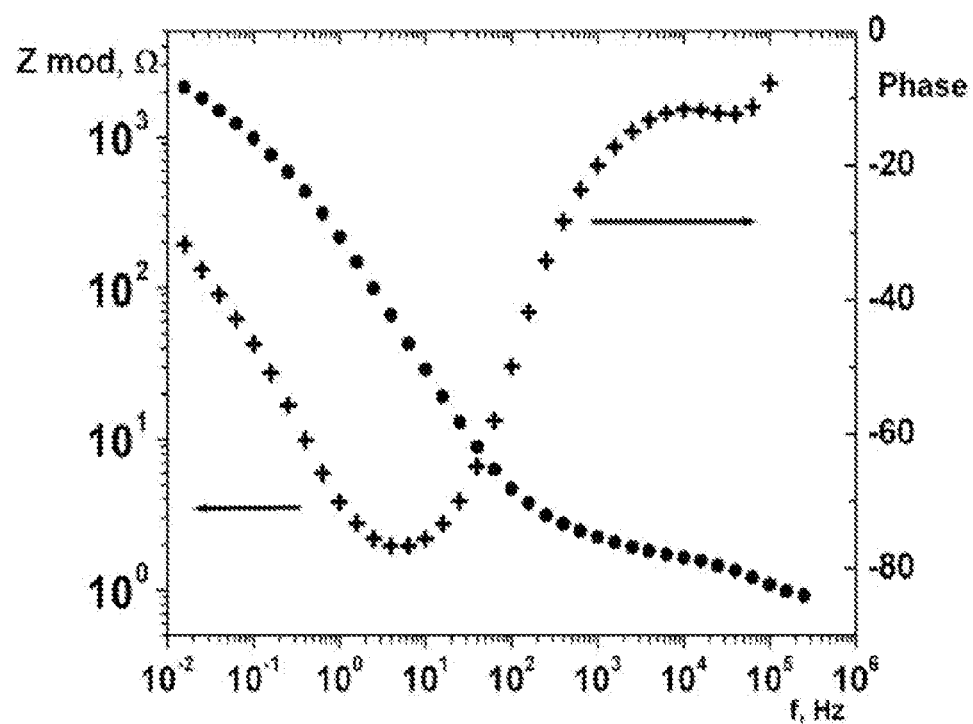
FIG. 2D shows electrochemical impedance spectroscopy (EIS) curves in accordance with the present invention.

The inventive supercapacitor apparatus with graphene platelet electrodes has electrochemical characterizations that are shown in the graphs in FIGS. 2A-2D. Specifically, FIG. 2A graphically shows voltammetric curves at various scan rates, FIG. 2B shows voltammetric curves at a high scan rate 10 V/s at various voltage limits, FIG. 2C shows a voltammetric curve at scan rate 50 V/s with a 10 V limit, and FIG. 2D shows the electrochemical impedance spectroscopy (EIS) curves.

Figure 3A:
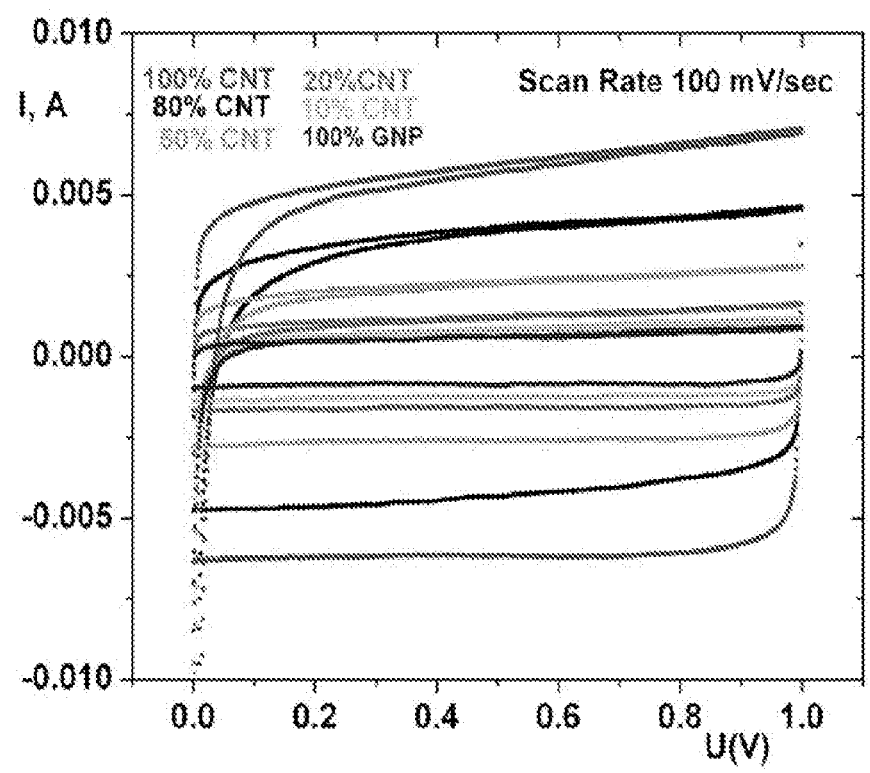
FIG. 3A shows voltammetric curves of different composites of GNP/CNT at high scan rate 100 V/s in accordance with the present invention.
Figure 3B:
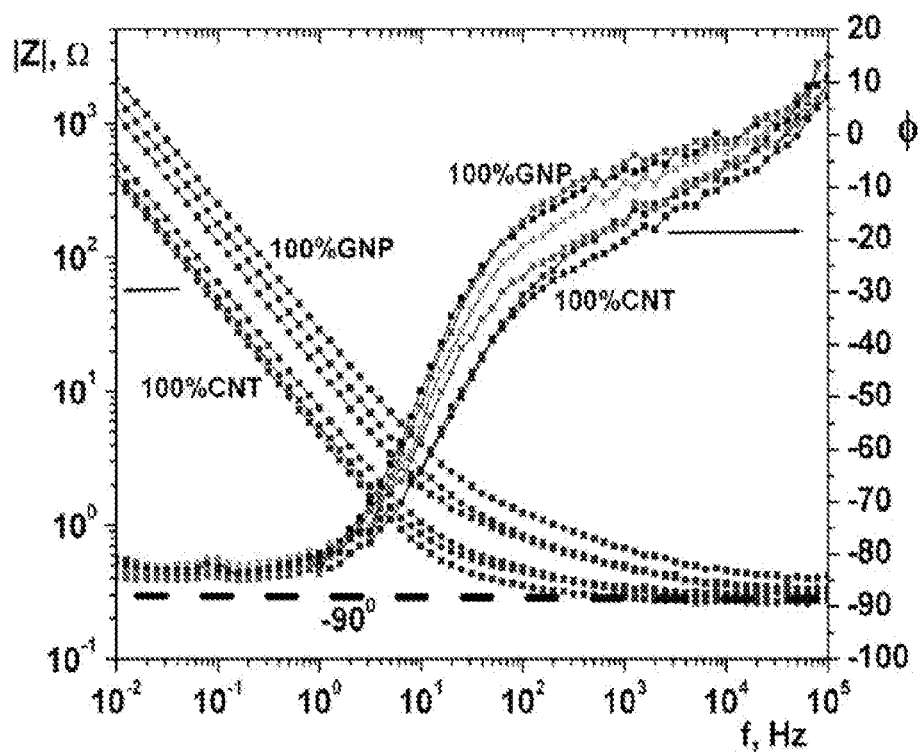
FIG. 3B illustrates EIS curves of different composites of GNP/CNT in accordance with the present invention.

In an embodiment, electrode formulation is designed by mixing carbon nanotubes and graphene nanoplatelets. In such embodiment, the electrode has improved energy storage performance, as demonstrated in FIGS. 3A and 3B. FIG. 3A illustrates voltammetric curves of different composites of GNP/CNT at high scan rate 100 V/s. FIG. 3B illustrates EIS curves of different composites of GNP/CNT. As illustrated, there are very low losses (phase shift close to −90°).

Preparation of the Electrodes

In accordance with certain embodiments of the invention, the supercapacitor electrodes are prepared as follows.

0.1 g of GNP (Graphene Supermarket) and 0.1 g of MWCNT (—OH) (MK Impex Corp., Canada) (50:50) are mixed together in 10 mL acetone (J T Baker, ACS reagent) and ultrasonicated (Branson 2800, Branson Ultrasonic Corp.) for 30 minutes. 5 wt. % of binder Kynar Flex 2801 (PVDF-HFP-Polyvinylidene fluoride-co-hexafluoro-propylene) is added to 10 mL of acetone and the mixture is ultra-sonicated (e.g., using Branson 2800, Branson Ultrasonic Corp.) for 30 minutes. The mixture containing GNP and MWCNT (50:50) is mixed with the binder in acetone mixture and the resulting mixture is further ultra-sonicated for 30 minutes.

4 $cm^2$ copper foil (100 μm Sigma Aldrich) are cut for use as current collectors. The current collectors are cleaned in 40% sulfuric acid solution (Sigma Aldrich, ACS reagent, 95.0-98.0%) to remove traces of oxidation, and then rinsed with distilled water and dried in air.

The electrode material is deposited by drop-casting of the prepared dispersion of GNP with binder using a pipette. Once the drop-casted mixture on the copper foil is dried in the air, the samples are annealed at 250° C. in an oven (e.g., Thermo Scientific) for 2 hours. The weight difference between the loaded cooper foil and the bare one gives the mass of the GNP electrode material.

The electrochemical capacitors are then assembled by sandwiching two 4 $cm^2$ electrodes between a 25 μm thick Celgard® separator impregnated with a suitable electrolyte solution, which allows ionic current to flow between the electrodes. The structure is pressed between two plates and sealed. Different compositions GNP/CNT are used as an electrode material and different electrode mass.

The electrolytes may be prepared in the following exemplary manners.

1 Molar Lithium perchlorate LiClO4 in Ethylene Carbonate EC/Diethyl Carbonate DEC (50:50) (e.g., provided by Sigma Aldrich) is prepared by adding 0.532 g of salt LiClO4 to solvents 3 g of EC and 3 g DEC (50:50), and the resulting mixture is magnetically stirred (e.g., using Corning PC-4200) at room temperature for 2 hours.

1 Molar Lithium perchlorate in a different solvent—gamma-Butyrolactone GBL (Sigma Aldrich) is prepared by adding 1.064 g of LiClO4 to 10 ml of GBL and the resulting mixture is magnetically stirred at room temperature for 2 hours.

1 Molar Tetraethylammonium tetrafluoroborate (TEABF$_4$)(Sigma Aldrich) in Ethylene Carbonate EC/Diethyl Carbonate DEC (50:50) is prepared by adding 1.085 g of ammonium salt TEABF4 to solvents 3 g of EC and 3 g of DEC and the resulting mixture is magnetically stirred at room temperature for 2 hours.

1 Molar Tetraethylammonium tetrafluoroborate (TEABF4) in gamma-Butyrolactone GBL is prepared by adding 1.085 g of ammonium salt TEABF4 to 5 ml of GBL and the resulting mixture is magnetically stirred at room temperature for 2 hours.

Other comparable electrodes and/or electrolytes may be employed, as would be appreciated by those in the art.

Figure 4A:
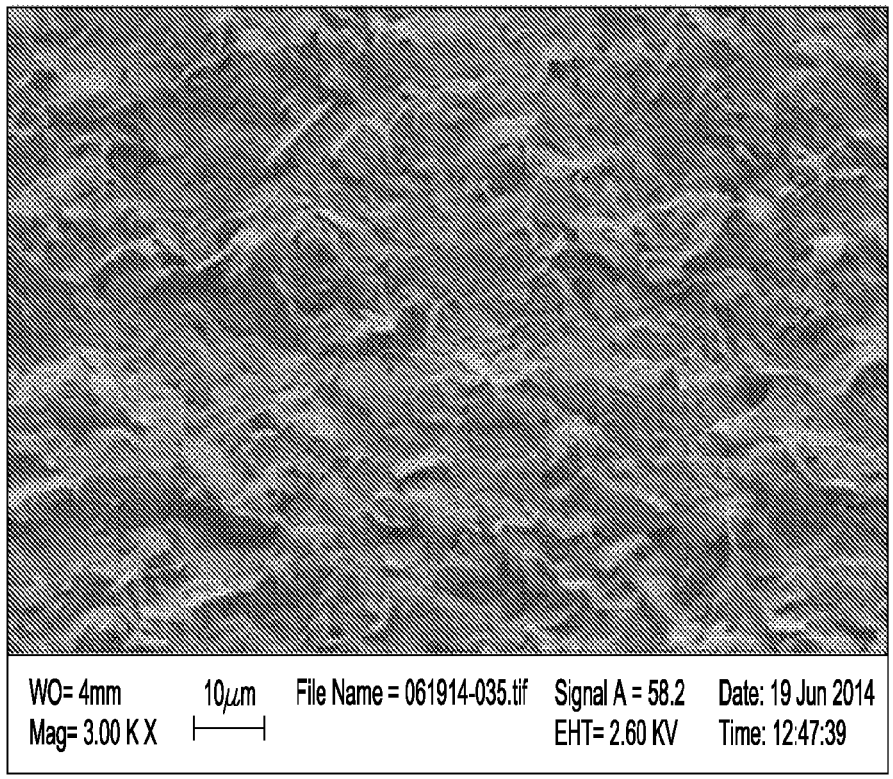
FIG. 4A shows scanning electron microscopy (SEM) images for graphene nano-platelet (GNP) electrode material, demonstrating "platelet" morphology at micrometer scale in accordance with the present invention.
Figure 4B:
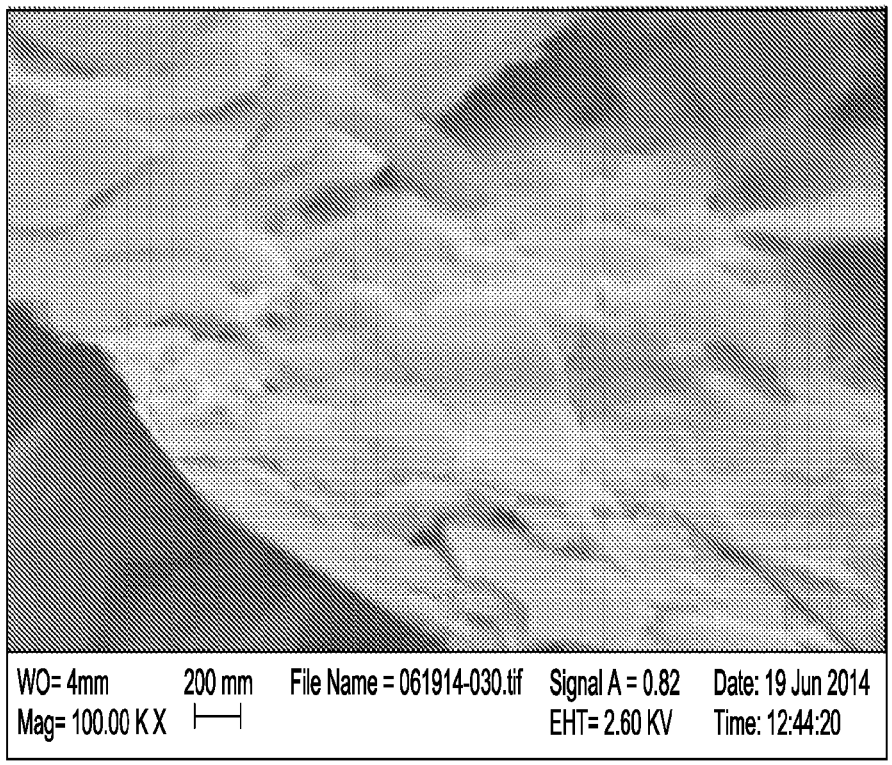
FIG. 4B shows scanning electron microscopy (SEM) images of graphene nano-platelet (GNP) electrode material, demonstrating "platelet" morphology at nanometer scale in accordance with the present invention.

FIGS. 4A and 4B show scanning electron microscopy (SEM) images of micrographs for graphene nano-platelet (GNP) electrode material, demonstrating "platelet" morphology at micrometer and nanometer scale, respectively. The electrochemical performance of the supercapacitor is characterized by cyclic voltammetry, galvanostatic charge-discharge and electrochemical impedance spectroscopy measurements performed with a Gamry 3000 Potentiostat. As shown in the figures, the demonstrated "platelet" morphology makes these particles especially effective in providing barrier properties.

Electrochemical Measurements

After the electrode is prepared and sealed, the cyclic-voltammetry (CV), galvanostatic charge-discharge, and electrochemical impedance spectroscopy (EIS) curves of the electrode cells are shown in FIGS. 5A-5F. During actual testing, a Gamry instruments Reference 3000 Potentiostat/Galvanostat/ZRA machine was utilized to obtain the curves.

Figure 5A:
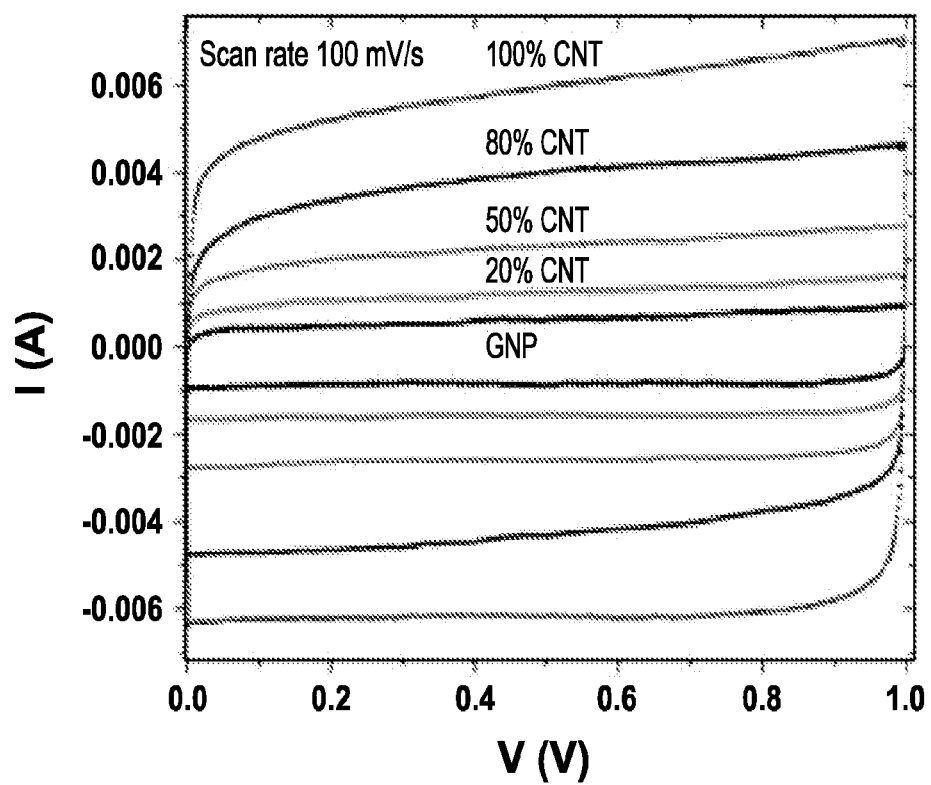
FIG. 5A shows voltammetric curves of CNT+GNP (50:50) at four different masses, with a scan rate of 100 mV s-1 in accordance with the present invention.
Figure 5B:
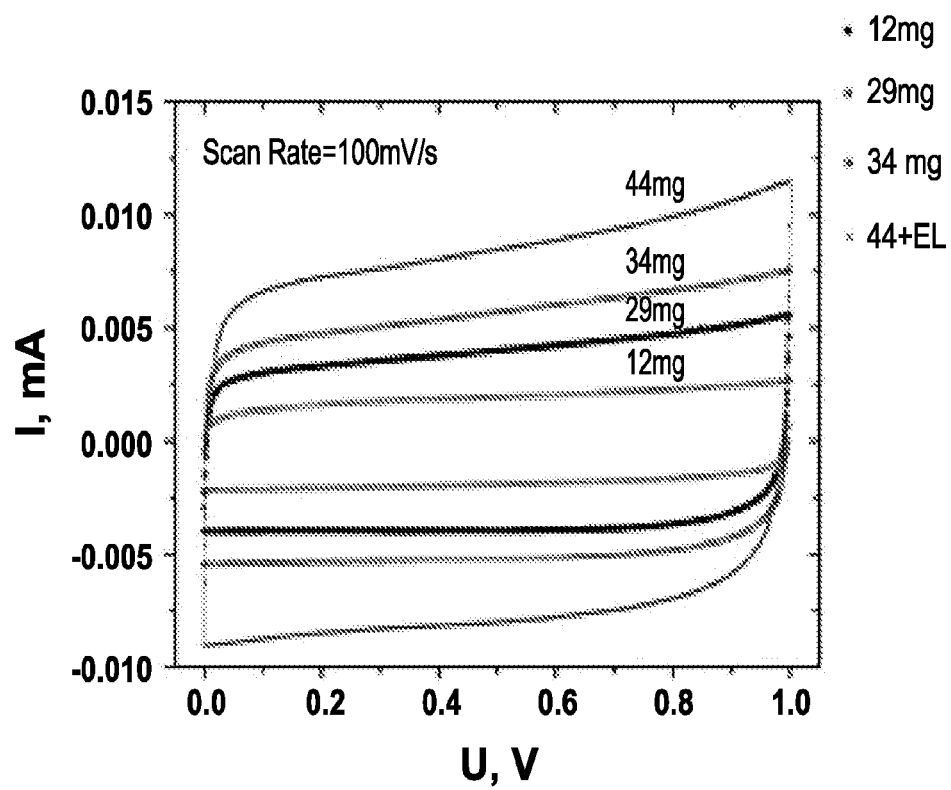
FIG. 5B shows voltammetric curves of CNT+GNP (50:50) at four different masses, with a scan rate of 200 mV s-1 in accordance with the present invention.
Figure 5C:
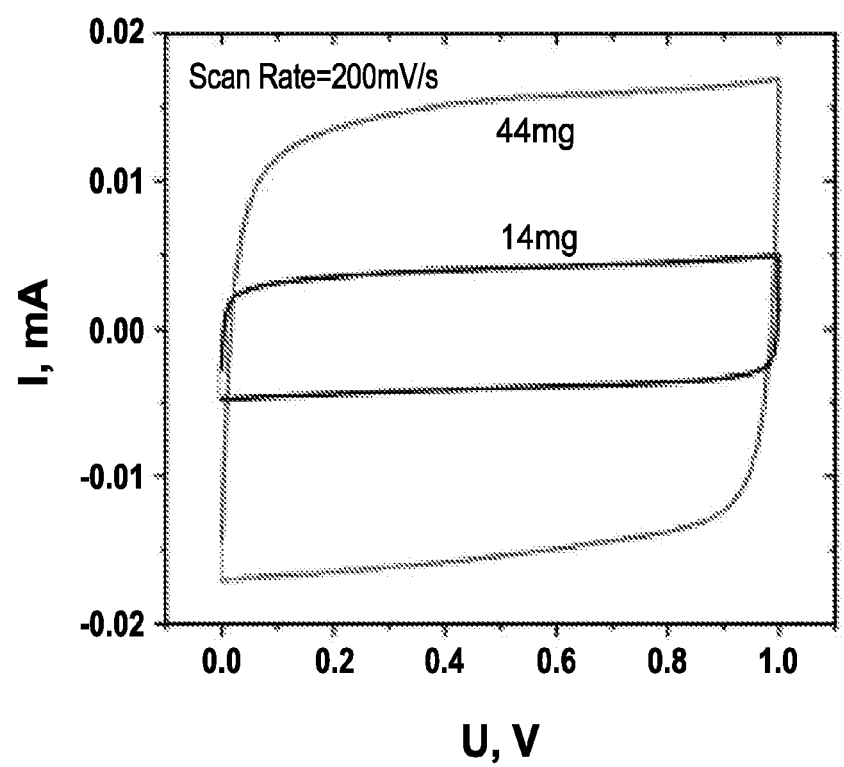
FIG. 5C shows voltammetric curves of different percentages of CNT+GNP used in material in accordance with the present invention.
Figure 5D:
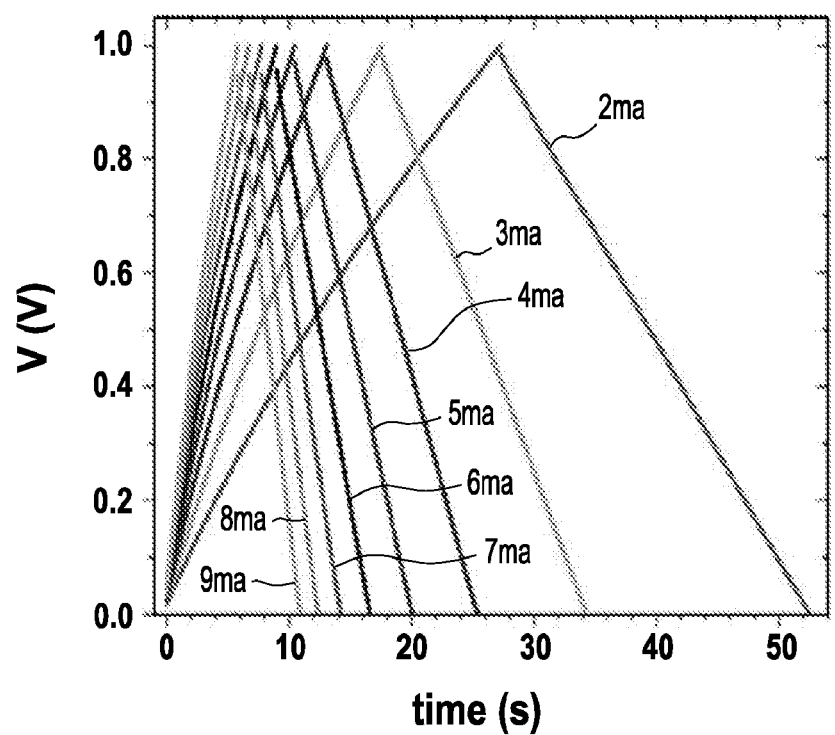
FIG. 5D is a charge-discharge curve of CNT+GNP (50:50) at different currents in accordance with the present invention.
Figure 5E:
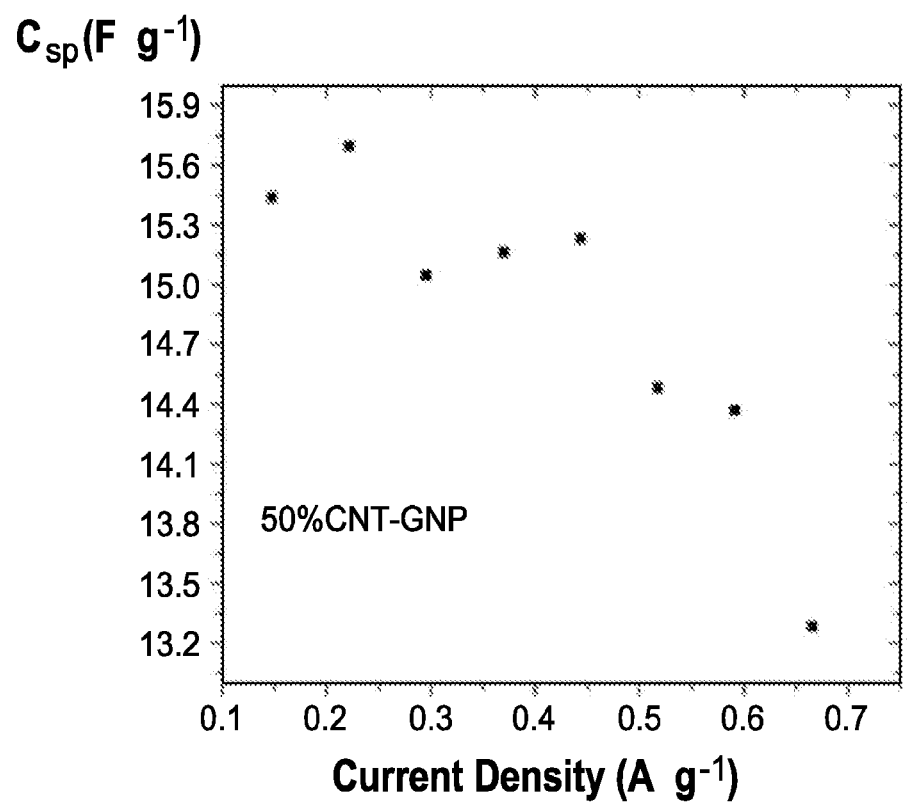
FIG. 5E shows the specific capacitance versus current density for CNT-GNP (50:50) in accordance with the present invention.
Figure 5F:
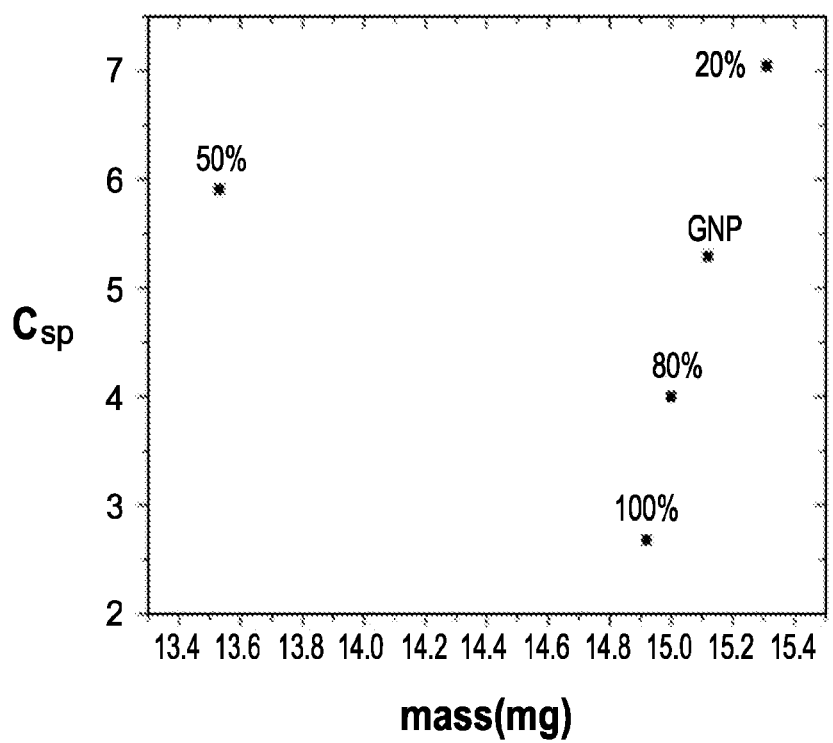
FIG. 5F shows the specific capacitance versus mass of the electrode for CNT+GNP at different percentages in accordance with the present invention.

In particular, FIG. 5A shows voltammetric curves of CNT+GNP (50:50) at four different masses, with a scan rate of 100 mV s-1. FIG. 5B shows voltammetric curves of CNT+GNP (50:50) at four different masses, with a scan rate of 200 mV s-1. FIG. 5C shows voltammetric curves of different percentages of CNT+GNP used in material. FIG. 5D is a charge-discharge curve of CNT+GNP (50:50) at different currents. FIG. 5E shows the specific capacitance versus current density for CNT-GNP (50:50). FIG. 5F shows the specific capacitance versus mass for CNT+GNP at different percentages.

The CV curves of the electrodes used a voltage from 0.0 to 1.0 with scan rates of 100 and 200 mV s$^{-1}$. As illustrated, the curves have a nearly rectangular shape and capacitance varies based on mass of the electrodes and percentages of CNT+GNP used. It can be seen that the mass affects the current and provides greater capacitance. Similarly, an electrode containing more CNT than GNP has created a greater capacitance than the usage of less CNT. The figures show slightly larger distortion as mass increases and the CNT used increases. The best curve results which are lacking greater distortion can be seen when the CNT-GNP ratio used was 50:50.

The charge-discharge curves in FIG. 5D show linear slopes and were tested at different capacitances. The best result from the charge-discharge curves was tested, the 50:50 CNT-GNP electrode, from which the specific capacitance was calculated. The charge-discharge curves indicate excellent ion transport behavior and good charge propagation within the electrodes. The specific capacitances were calculated for the various currents used in the charge-discharge curve; the highest being 15.67 and the lowest 13.29 F g$^{-1}$ with current densities of 0.22 and 0.67 A g$^{-1}$ respectively. The IR drop decreases with a higher current. It is also relatively small even at a lower current of about 0.05.

As discussed, the supercapacitor apparatus was tested for cyclic voltammetry, galvanostatic charge-discharge, and electrochemical impedance spectroscopy.

The capacitance (C) was determine according to equation 1.

$$C = \frac{4I}{dV/dt} \quad (1)$$

where I (A) is discharge current and dV/dt is a slope of the discharge curve after an ohmic drop (V/s).

The gravimetric specific capacitance, $C_{sp}$(F g$^{-1}$), was calculated from the charge-discharge curves according to equation 2.

$$C_{sp} = \frac{4I}{mdV/dt} \quad (2)$$

where I is the current, m is the mass of both electrodes, and dV/dt is the scan rate of the charge-discharge. The mass can also be replaced by volume or area of the electrodes depending on the nature of the applications. The energy density (E, Wh/kg) and the power density (P, W/kg)=E/t in a supercapacitor can be calculated by equations 3 and 4, $$E = \frac{CV^2}{2} \quad (3)$$

$$E = \frac{V^2}{4R_s} \quad (4)$$

where C (F g$^{-1}$) is the total capacitance of the cell, V is the cell voltage, $R_s$ is an equivalent series resistance and t is the discharge time (h).

Due to the fact that the energy stored in the supercapacitor apparatus is linear with the capacitance and is proportional to $V^2$, developing an internal structure of the supercapacitor with multilayered electrodes, the operational electrochemical window of the power law ($V^2$) and the energy density of the supercapacitor are increased significantly.

Parallel—Series Connection

Figure 6A:
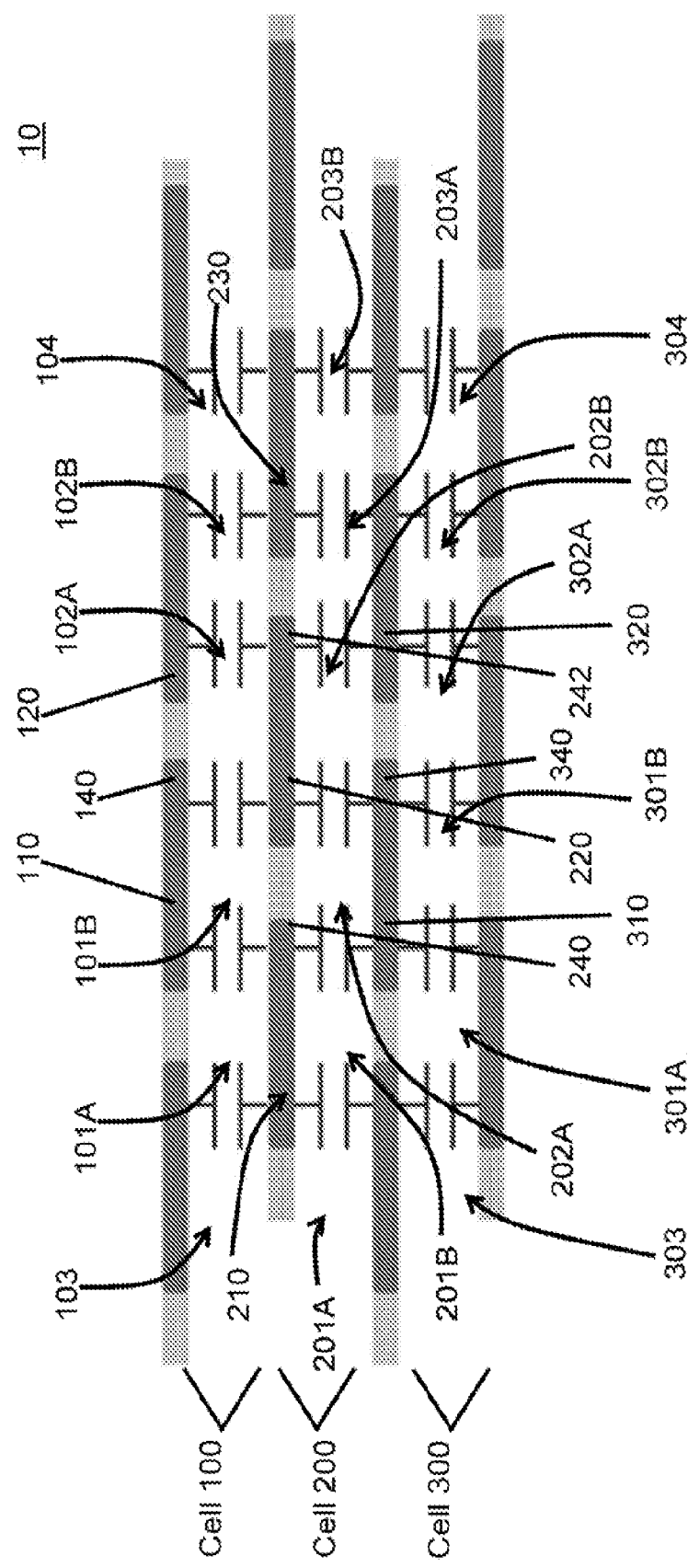
Figure 6B:
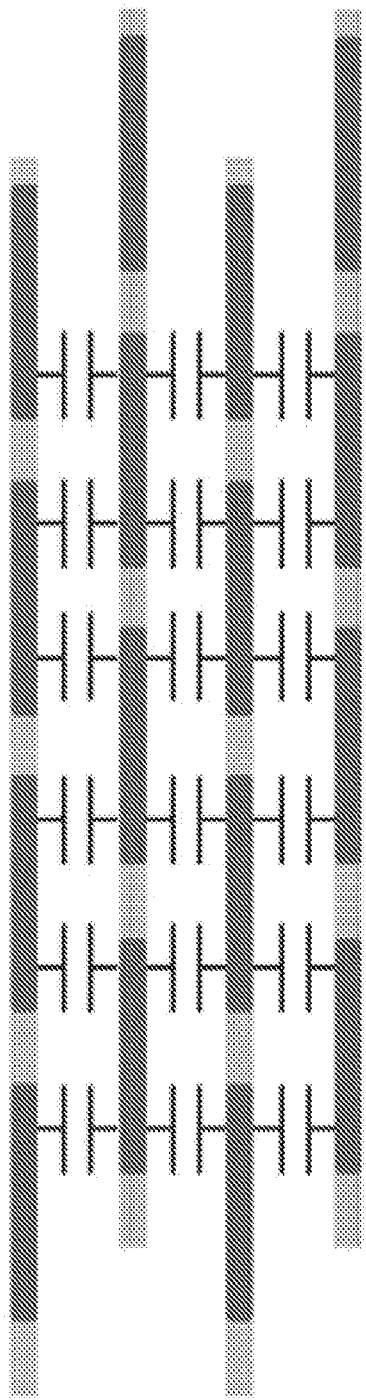

In accordance with certain embodiments, the supercapacitor apparatus 10 (also referred to herein as EDLC assembly 10 or cell stack assembly 10) includes a set of individual supercapacitors (also called herein EDLC sub-cells) interconnected in the manner schematically illustrated in FIGS. 6A and 6B. FIG. 6B is a duplicate of FIG. 6A, but without reference numbering so that the schematic diagram is not obscured by the reference numbers and arrows. In FIGS. 6A and 6B, each capacitor symbol symbolically represents a supercapacitor.

As shown in FIG. 6 (i.e., FIGS. 6A and 6B), the supercapacitor apparatus 10 of the present invention has at least two cells 100, 200 (a third cell 300 also shown) that are physically stacked on one another in a staggered configuration, to be further explained.

Figure 7A:
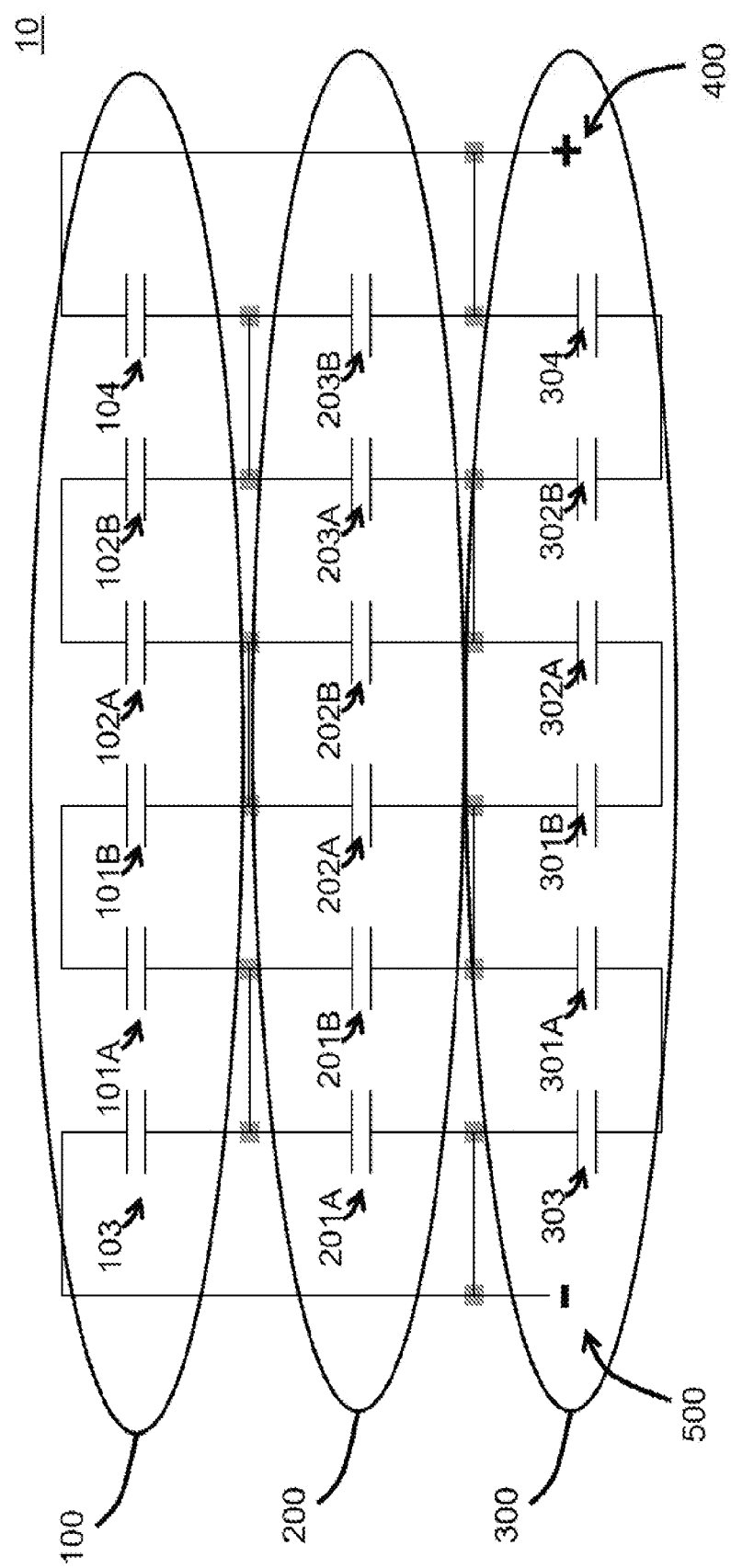
Figure 7B:
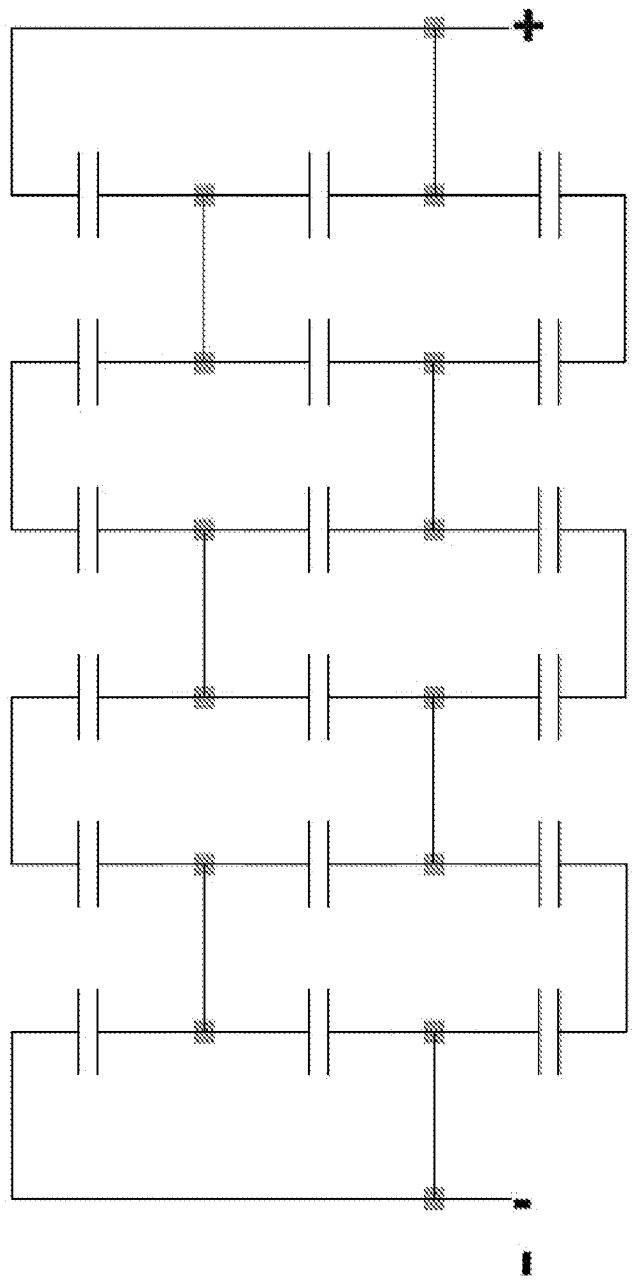

FIGS. 7A and 7B are the same circuit diagram that show the circuit connection of supercapacitor apparatus 10 shown in FIG. 6. FIG. 7B does not include the reference information to make the circuit diagram more clearly viewable.

As particularly shown in FIG. 6 and in FIG. 7 (i.e., FIGS. 7A and 7B), each cell includes pairs of supercapacitors (EDLC sub-cells). In the exemplary arrangement shown in FIGS. 6 and 7, cell 100 includes a first pair of supercapacitors 101A, 101B and a second pair of supercapacitors 102A, 102B, as well as non-paired supercapacitors 103, 104. The second cell 200 includes three pairs of supercapacitors: a first pair 201A, 201B; a second pair 202A, 202B; and a third pair 203A, 203B. The third cell 300 includes pairs of supercapacitors: first pair 301A, 301B; and second pair 302A, 302B, and non-paired supercapacitors 303, 304. It is noted that the terminology pair and non-paired are used herein solely for convenience in describing the electrical layout of the supercapacitors relative to one another.

Each supercapacitor includes associated electrodes. For instance, supercapacitor 101A includes a first electrode 110 (on one end of the supercapacitor) and a second electrode 220 (at its other end). As illustrated in FIG. 6, most (if not all) of the electrodes are common (or otherwise electrically coupled) to multiple supercapacitors. For instance, electrode 110 is common to supercapacitors 101A and 101B. Likewise, electrode 120 is common to supercapacitors 102A and 102B.

However, due to the staggered arrangement amongst adjacent cells (e.g., cells 100 and 200), those same supercapacitors do not have a common electrode (or otherwise electrically coupled) on their respective other ends. Likewise, supercapacitors 102A and 102B, on their other end, do not share a common electrode (or otherwise electrically coupled). Instead, electrode 220 is common to supercapacitors 101B and 102A. Also, as shown, electrode 210 is common to supercapacitors 103A and 103, and electrode 230 is common to supercapacitors 102B and 104.

The supercapacitors 201A, 201B, 202A, 202B, 203A, 203B of cell 200 have a similar configuration as the supercapacitors of cell 100, but are staggered (i.e., offset) as shown. As perhaps more clearly shown in FIG. 7B, it is seen that the arrangement of the supercapacitors of cell 200 are in a mirror configuration (line symmetry) as the arrangement of the supercapacitors of cell 100.

More particularly, as shown in FIG. 6, electrode 210 is common to supercapacitors 201A and 201B, electrode 220 is common to supercapacitors 202A and 202B, and electrode 230 is common to supercapacitors 203A and 203B. As for the cell 200 supercapacitors' other electrodes (shown at the lower end of cell 200 in FIG. 6), electrode 310 is common to supercapacitors 201B and 202A, and electrode 320 is common to supercapacitors 202B and 203A. The other electrodes of supercapacitors 201A and 203B (i.e., the lower electrodes of these capacitors shown in FIG. 6) are not common to any other supercapacitor in cell 200.

The configuration of the cell 300 supercapacitors (i.e., supercapacitors 301A, 301B, 302A, 302B, 303, 304) is identical to the configuration of cell 100 (as more clearly shown in FIG. 7). In other words, the supercapacitors of the third cell are intra-connected in a manner identical to the intra-connection of the supercapacitors of the first cell.

Also as shown in FIGS. 6 and 7, the supercapacitors of each cell are coupled to particular supercapacitors in each adjacent cell. That is, each supercapacitor of one cell (e.g., cell 100) has a common electrode with (or is otherwise electrically coupled to) a respective supercapacitor of an adjacent cell. For instance, supercapacitor 101A has a common electrode (i.e. electrode 210) with supercapacitor 201B, supercapacitor 101B has a common electrode (i.e., electrode 220) with supercapacitor 202A, and so on. This arrangement likewise exists between the supercapacitors of cell 200 and adjacent cell 300.

Each electrode of each cell is isolated from one another by any suitable means. For instance, electrode 110 and 120 may be electrically isolated by an isolator 140 made of a non-conducting material. Other isolators shown in FIG. 6 include isolators 140, 240, 242, 340 (other isolators not numbered). The isolators may also be a gap of sufficient length between the electrodes.

As stated herein, most of the supercapacitors have a common electrode with another supercapacitor. For example, as already mentioned herein, electrode 110 is common to supercapacitors 101A, 101B. Also, as shown in FIG. 6, electrode 210 can be said to be common to supercapacitors 103, 101A, 201A and 201B. However, in one or more variations, the "common electrode" may comprise multiple, distinct electrodes electrically coupled to one another. Hence, the term "common electrode" is intended to cover any version of the electrode discussed herein, whether it is single conductive material, two conductive materials electrically connected or more than two conductive materials electrically connected. Thus, the term common electrode broadly refers to a single shared electrode (or shared multiple electrodes), or to two or more electrodes (of each associated supercapacitor) that are electrically connected.

Accordingly, it is described and illustrated herein that the supercapacitors of each cell of the supercapacitor apparatus 10 of the present invention has a parallel-series connection (also referred to herein as "parallel-series configuration").

FIG. 7 shows positive terminal 400 and a negative terminal 500 for external connection.

Figure 8:
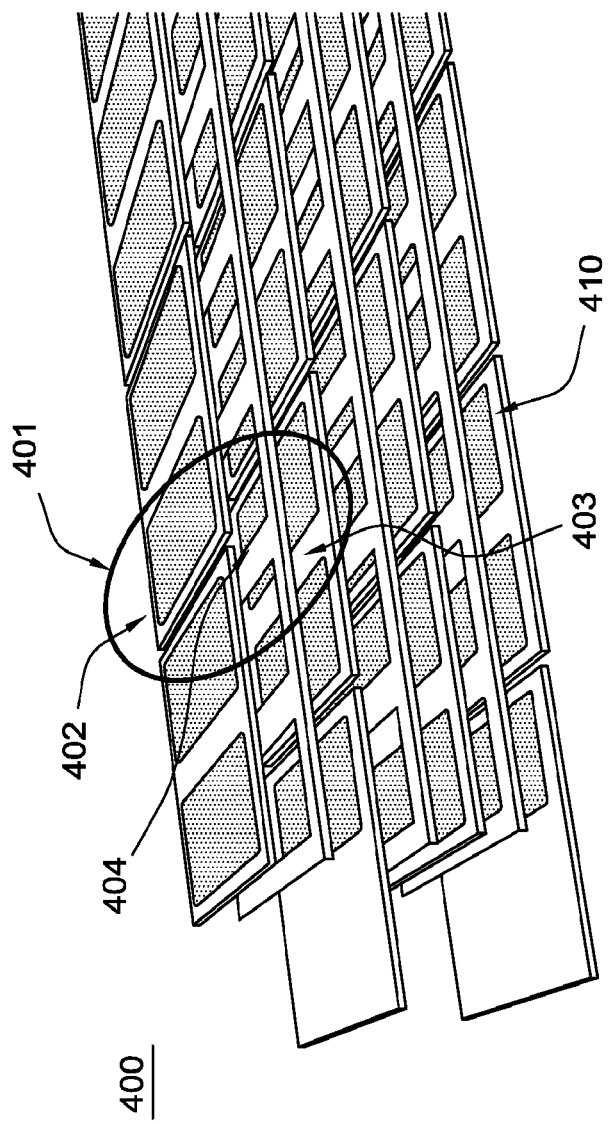
FIG. 8 is an isometric view of a portion of the supercapacitor apparatus in accordance with the present invention.

FIG. 8 is an isometric view of a portion of a representative supercapacitor apparatus 400, which particularly shows the locations of the electrodes of the supercapacitors along with the location of the electrolyte solution. In particular, a representative supercapacitor 401 is comprised of two electrodes 402, 403 with electrolyte solution 404 (along with the separator) sandwiched between the electrodes. The electrolyte solution and separator may be as described herein, or other appropriate electrolyte solution and appropriate separator. Also, as shown in FIG. 8, various electrodes are isolated from one another by a suitable isolator 410, which may be a gap, non-conductive material or other known isolator device/technique.

Figure 9:
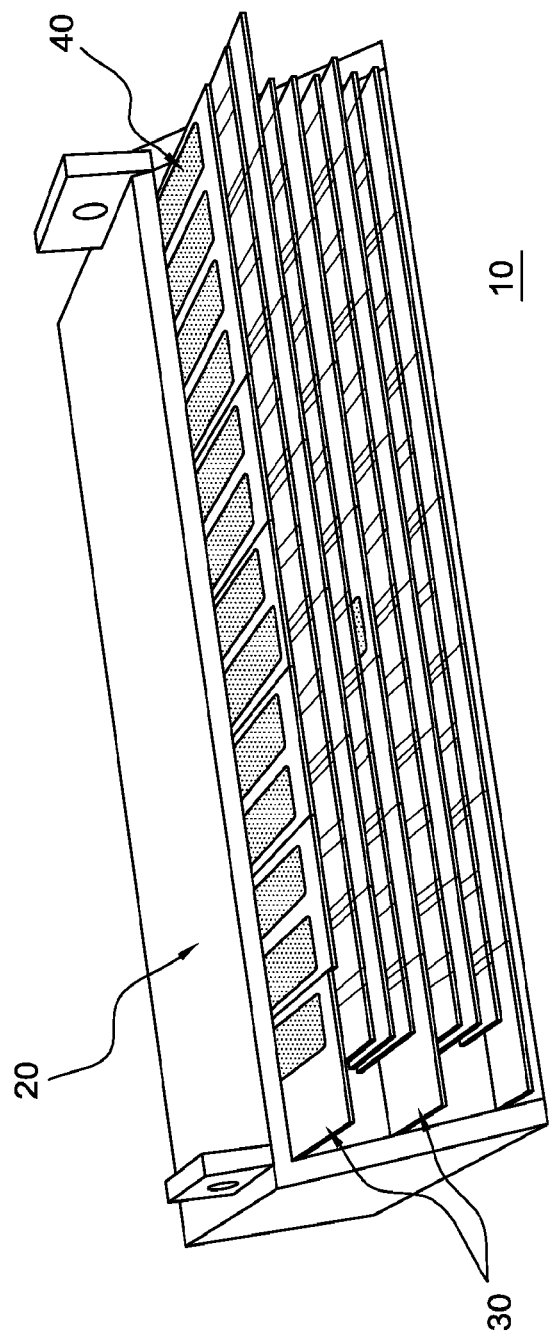
FIG. 9 is a schematic illustration of a supercapacitor apparatus within a housing in accordance with the present invention.

FIG. 9 is a schematic illustration of supercapacitor apparatus 10 within a housing 20, along with the various cells 30 and electrodes 40.

As described herein and illustrated in the various figures, the supercapacitor apparatus of the present invention includes multiple cells connected in a parallel-series configuration and, in such configuration, the apparatus provides a relatively high stand-off voltage along with passive balancing. In certain embodiments, the electrodes are graphene platelet as described herein.

In certain embodiments, the cell stack may include four, six, eight, ten, twenty, or other suitable number of cells. Moreover, each cell can include two or more supercapacitors (or pairs of supercapacitors). The arrangement of the supercapacitors of each cell follows the structure/configuration shown in FIG. 7.

In the exemplary embodiment described and shown in connection with FIGS. 6 and 7, three cells are shown with each cell having six supercapacitors. However, as mentioned herein, the present invention is not limited to these specific numbers.

Also in accordance with the present invention, the supercapacitor apparatus includes multiple cells interconnected in a parallel-series configuration as described herein, and each of the supercapacitors therein may be manufactured in any suitable manner including any manner described herein. For instance, each electrode is a graphene electrode as described herein, but in variations, each electrode may be non-graphene or other type as would be appreciated by those in the art. In yet another variation, the supercapacitor apparatus may include supercapacitors with different types of electrodes, as desired.

When supercapacitors are interconnected in the manner described herein, the inventive supercapacitor apparatus can have a stand-off voltage that exceeds or well exceeds 3 volts. For instance, stand-off voltages of 10 volts, 20 volts and 30 volts, and so on, are possible. In certain embodiments, the supercapacitor apparatus includes at least four cells configured to provide a stand-off voltage of 10 volts. In certain embodiments, the supercapacitor apparatus includes at least eight cells configured to provide a stand-off voltage of 20 volts. With other configurations, stand-off voltages in different amounts are possible.

Figure 10:
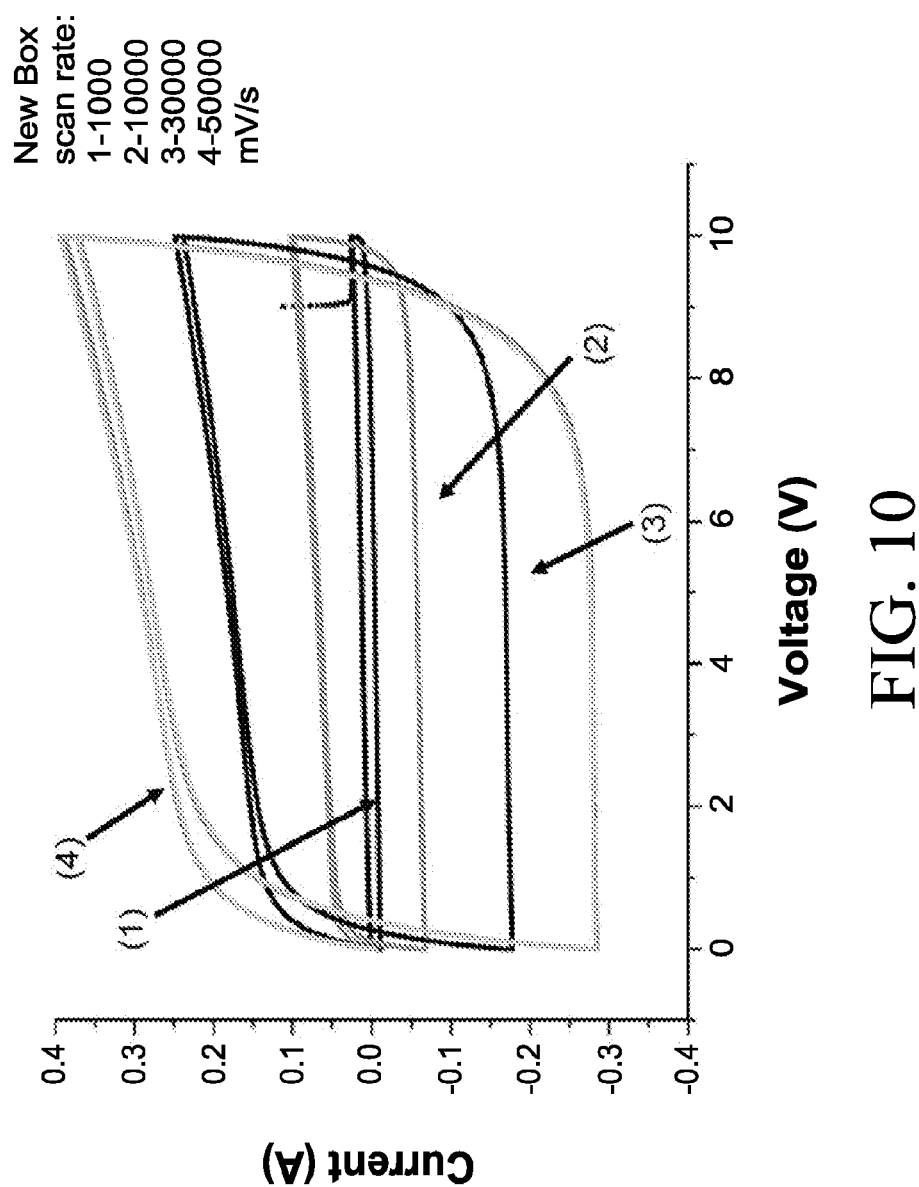
FIG. 10 shows voltammetric curves at various scan rates for a 10-volt embodiment of the supercapacitor apparatus with graphene platelet electrodes in accordance with the present invention.
Figure 11:
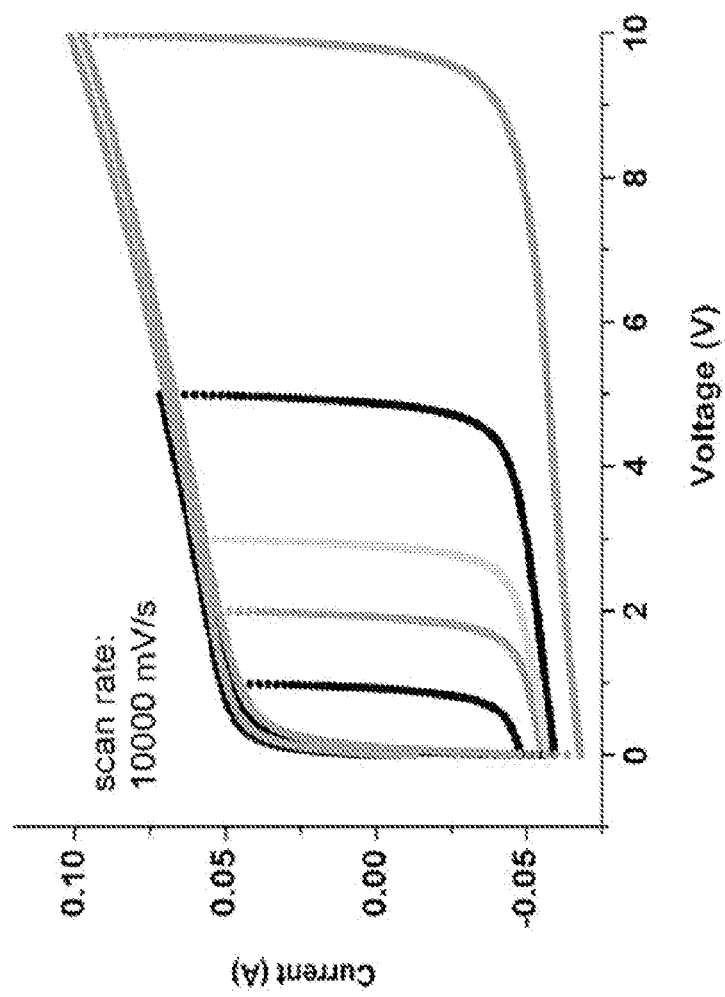
FIG. 11 shows voltammetric curves at a scan rate 10,000 mV/s for the 10-volt embodiment of the present invention.

FIG. 10 is a graph of CV data at various scan rates for a 10-volt embodiment of the supercapacitor apparatus with graphene platelet electrodes. FIG. 11 is a graph of CV data at a scan rate 10,000 mV/s for the 10-volt embodiment.

As discussed herein, the supercapacitor apparatus of the present invention provides a substantial increase in the operational electrochemical window that, in turn, provides a tremendous increase in the energy density of supercapacitors. The stacks of EDLC cells that comprise the supercapacitor apparatus preferably are sealed within a housing and, due to the parallel-series configuration of the EDLCs, the apparatus is balanced internally. Like a single supercapacitor unit, no external balancing is needed. Moreover, since no external balancing is needed, the supercapacitor apparatus of the present invention does not require that each supercapacitor or even each cell has electrical leads or other means to allow for external connection thereto. As illustrated in FIGS. 7A and 7B, the supercapacitor apparatus (in certain embodiments) only includes the positive and negative terminals for external connection. When sealed within a housing, the housing (in certain embodiments) includes only positive and negative terminals for external connection to the cells sealed within the housing. Accordingly, there are no terminals to (or other means to externally connect with) all of the superconductors and/or all of the cells within the housing. However, in certain other embodiments, it may be desirable for various purposes to externally connect to one or more electrodes or other component within the apparatus.

The electrodes of the EDLCs, in certain embodiments, contain nanocarbon composites of either a commercial shell derivative YP-80 or a graphene platelet (GNP) with multi-walled carbon nanotubes (MWCNT). The electrodes in certain embodiments are easily reproducible and exhibited high capacitance density of over 200 F/g and low electrolyte leakage.

In certain embodiments, the graphene nanoplatelet composite material (GNP) for the supercapacitor electrodes are cost effective. GNP represent a new class of carbon nanoparticles with multi-functional properties, as very high intrinsic electrical conductivity in plane, as well as high mechanical strength and chemical stability and high accessible surface area.

The present invention targets at least the following shortcomings of the state-of-the-art supercapacitor storage units: (i) high cost of the stored energy; (ii) low volumetric energy density; and (iii) need for external balancing.

Figure 12A:
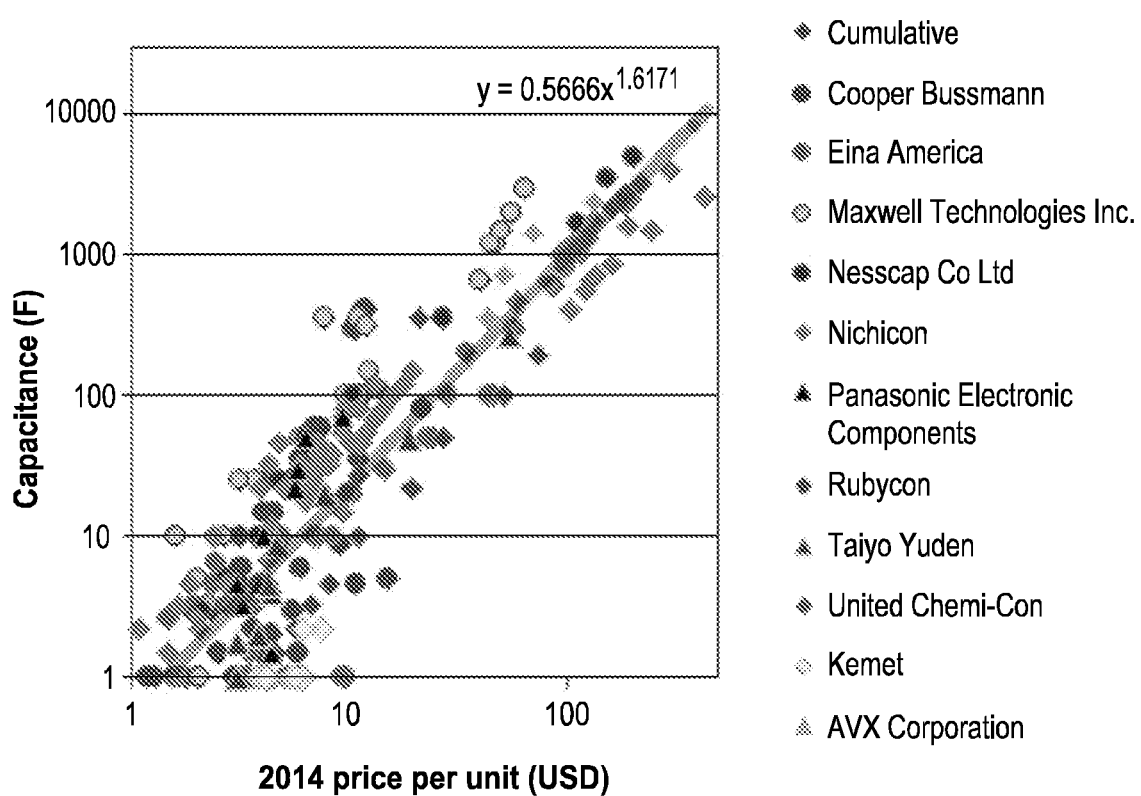
FIG. 12A is a schematic diagram that shows 2014 cost of capacitance for ten major manufacturers of supercapacitors.
Figure 12B:
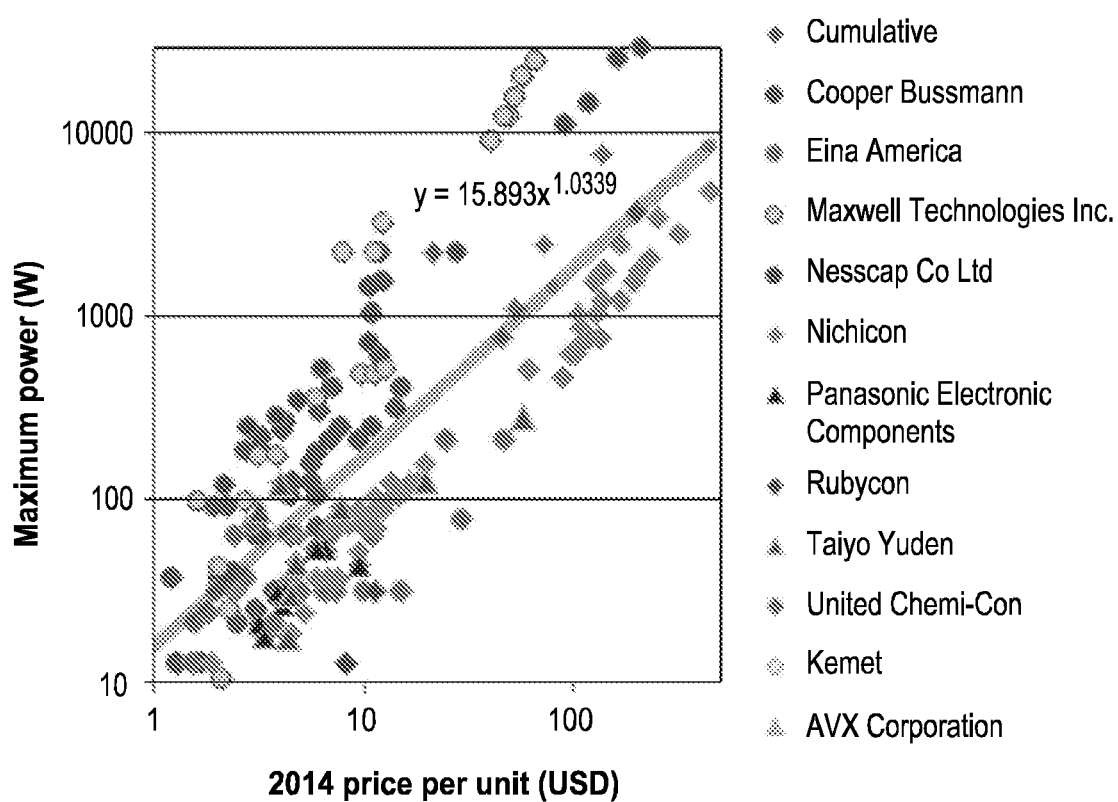
FIG. 12B is a diagram that shows the cost of maximum power for the ten major manufacturers of supercapacitors.

FIGS. 12A and 12B are graphs that correlate capacitance and maximum power with the unit cost (2014 data). Specifically, FIG. 12A schematically shows 2014 cost of capacitance for ten major manufacturers of supercapacitors. FIG. 12B shows the cost of maximum power for those manufacturers.

Figure 13A:
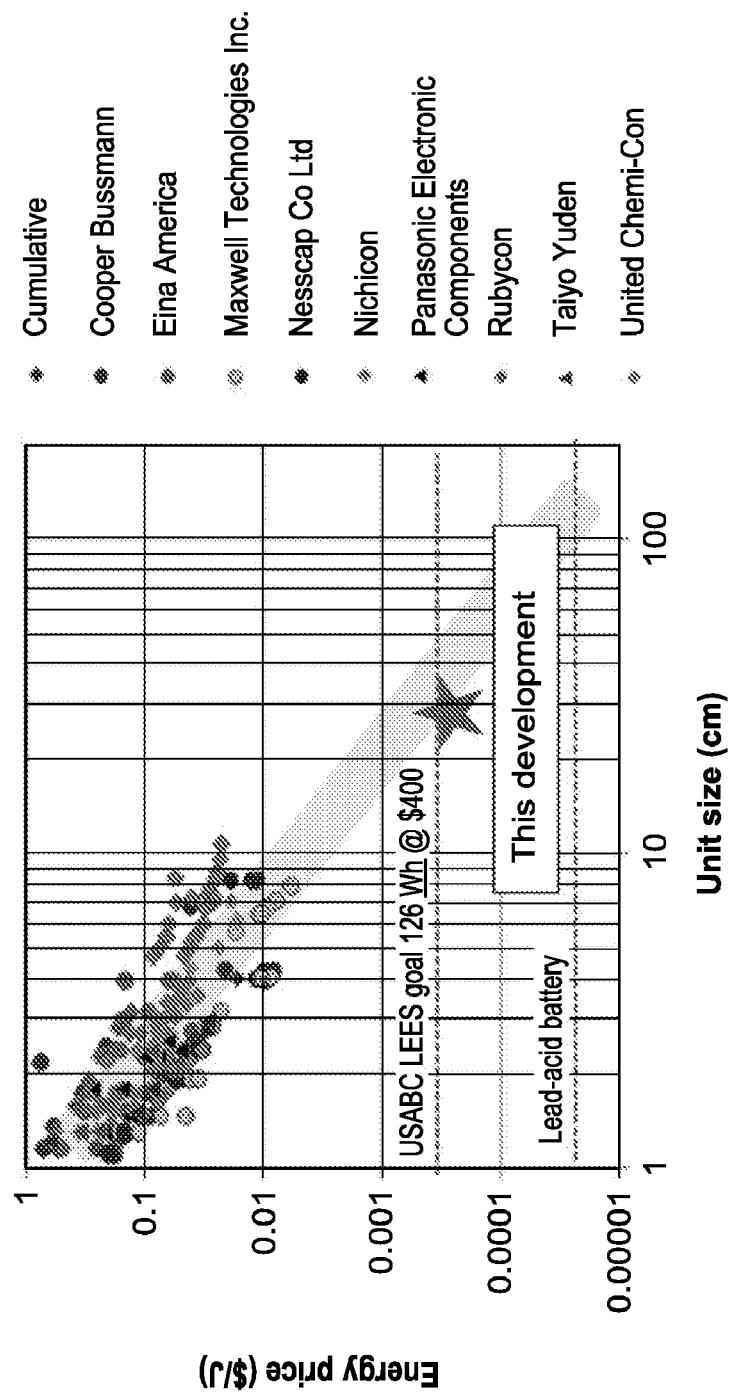
FIG. 13A is a diagram that shows scaling of the volumetric stored energy cost (units of $/J) for the major manufacturers of supercapacitors along with the stable energy cost of the present invention.
Figure 13B:
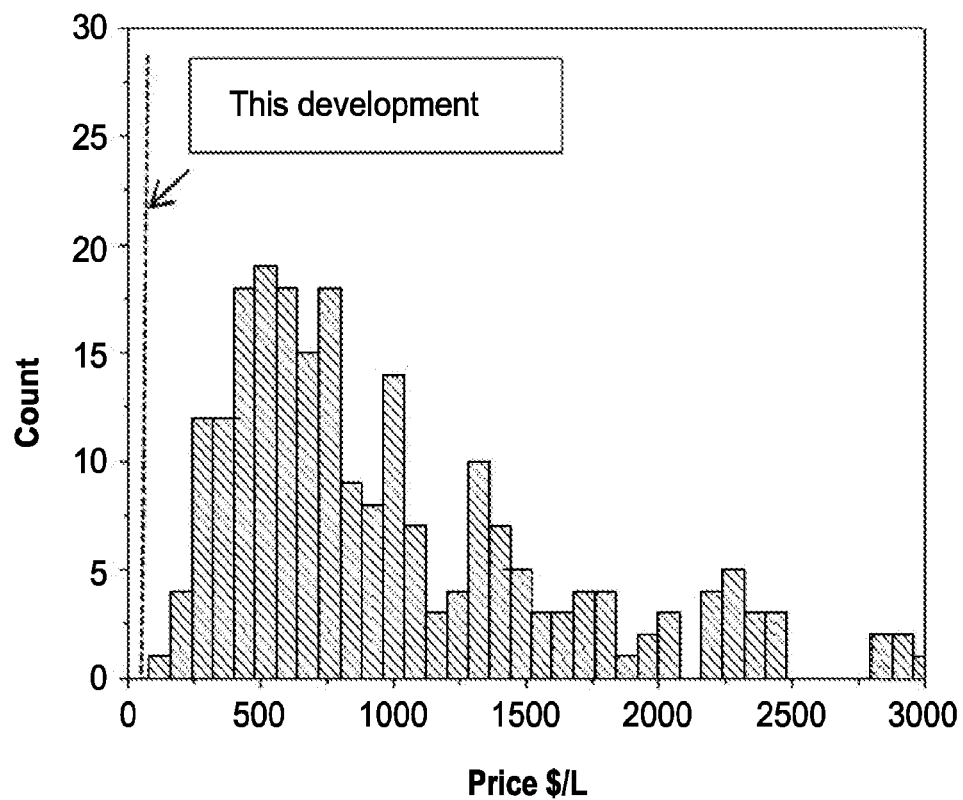
FIG. 13B is a diagram that shows the projected cost per liter of storage employing the present invention is about $25/L, as compared to the cost per liter of currently available supercapacitors.

The present invention substantially reduces the cost of stored energy. FIGS. 13A and 13B are diagrams that compare costs for the 10 manufacturers identified in the prior figures to that of the present invention ("This development"). FIG. 13A presents scaling of the volumetric stored energy cost (units of $/J) for the major manufacturers of supercapacitors along with the stable energy cost of the present invention. FIG. 13A also shows the goal of the USABC (U.S. Advanced Battery Consortium) LEES as well as the lead-acid battery metric ($200, 100 A/hr unit). FIG. 13B shows that the projected cost per liter of storage employing the present invention is about $25/L, as compared to the cost per liter of currently available supercapacitors. Specifically, the cost per liter for the present invention is 20 times lower than the industry average of $500/L.

In accordance with the present invention, cost reduction is achieved by integrating the individual low-voltage cells into a high-voltage unit as described herein. Accordingly, a low-cost, large high-voltage unit can be manufactured by a roll-to-roll process, which eliminates labor-intensive interconnections.

Figure 14:
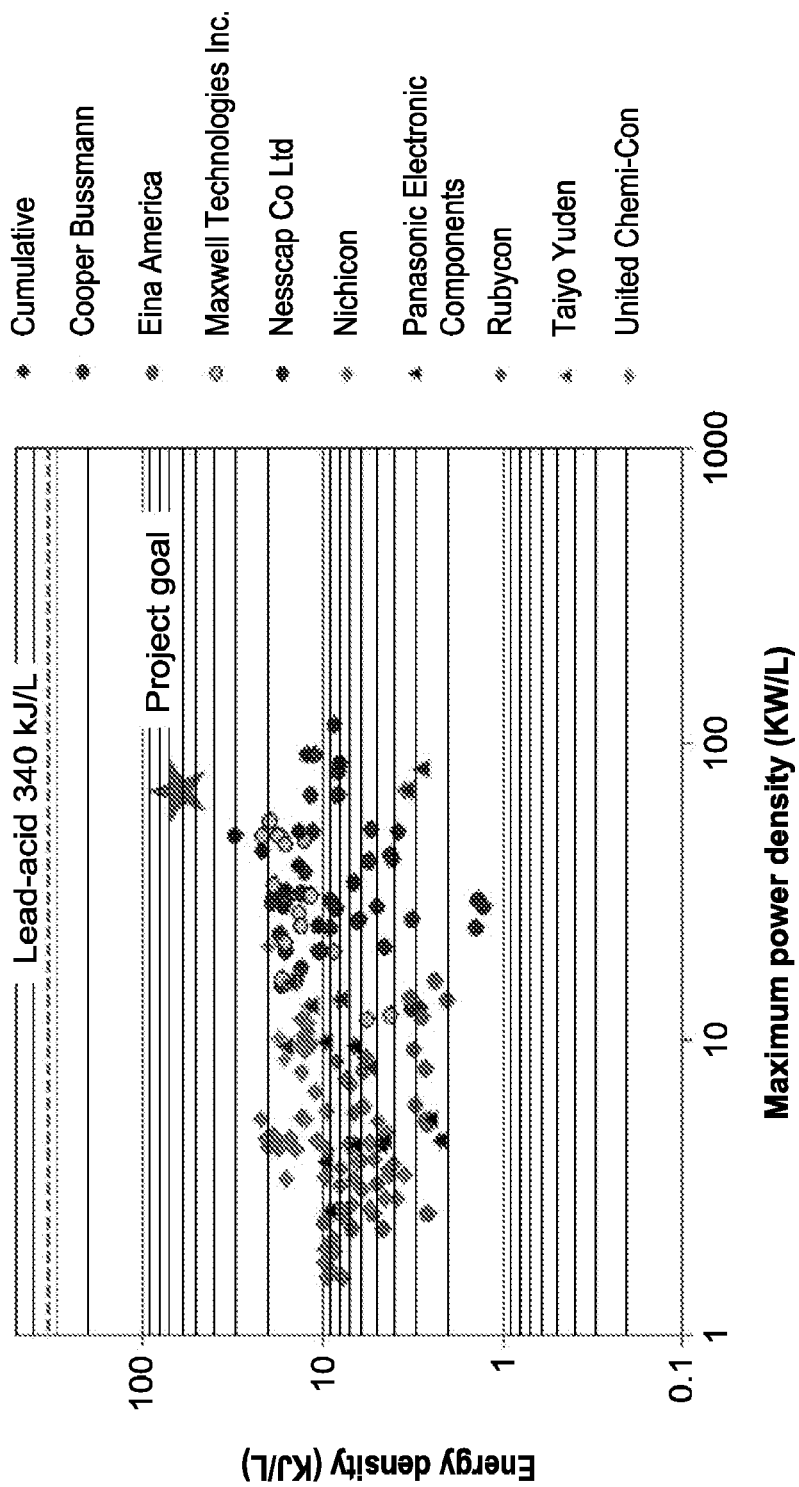
FIG. 14 is a diagram that shows the volumetric energy density of select state-of-the-art supercapacitor units in comparison to that provided by the supercapacitor apparatus of the present invention.

As mentioned earlier, another shortcoming of state-of-the-art supercapacitor storage units is low volumetric energy density. FIG. 14 shows the volumetric energy density of select state-of-the-art supercapacitor units in comparison to that provided by the supercapacitor apparatus of the present invention. The present invention (shown as "Project Goal") provides, in certain embodiments, a supercapacitor apparatus with an energy density that exceeds the energy density of all of the identified state-of-the-art supercapacitor units, as well as a maximum power density near the top range of the state-of-the-art units. The project goal, as shown in the figure, is 50 KJ/L, 100 KW/L.

Figure 15B:
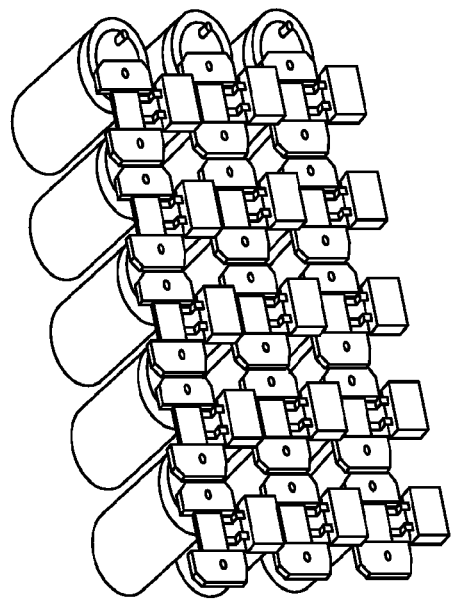
FIG. 15B is a schematic illustration of a prior art series connected unit with balancing boards.
Figure 15A:
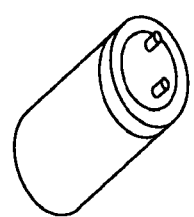
FIG. 15A is a schematic illustration of an individual supercapacitor unit.

A further shortcoming of state-of-the-art supercapacitor storage units is the need for sophisticated electronic balancing boards that are employed to equalize charges between the units. FIG. 15A shows an individual supercapacitor unit, generally with a 3-volt maximum voltage, and FIG. 15B shows a prior art series connected unit with a higher stand-off voltage (generally known as a supercap unit). However, the balancing boards for this unit are complex, bulky, require connections to each supercapacitor unit, entail expensive assembly, and often have reliability issues. The present invention, on the other hand, is internally balanced and thus does not require the use of an external balancing circuit or individual connections to each supercapacitor unit or even to each individual cell.

As discussed herein, the multi-cell, multi-layer high voltage supercapacitor apparatus including graphene electrodes, and the various embodiments and variations thereof described herein, provides various advantageous features and benefits, significantly contributing to the field of high energy storage devices. Some of the features and benefits, as already discussed, in certain embodiments, include the following:

Reach or exceed the industrial state of the art capacitance density of >200 F/g:

Highly electrochemically active graphene nano-platelet/ carbon nanotube electrodes;

Robust solid-state electrolytes for supercapacitor technologies as advanced electrochemical power sources for transportation and portable electronic applications;

Novel design and implementation of a sealed high-voltage EDLCs energy storage unit, internally balanced, without need for an external balancing circuit;

Advantageous electrode-electrolyte combination for extremely low leakage losses;

Solid-state super capacitors with graphene oxide separators/electrolytes;

Useful in multiple applications including regenerative braking and micro-grid VAR;

Other features and benefits as described herein.

LEGEND

For reference purposes, Table 1 below sets forth the various elements and components identified in the figures of the present application. Not all components in the figures include or are otherwise identified by a reference number. The table is only representative of numbered components in the figures and is intended to be used as a reference only.

TABLE 1

| Ref. | Name |
| --- | --- |
| 10 | Supercapacitor Apparatus |
| 20 | Housing |
| 30 | Cells |
| 40 | Electrodes |
| 100 | Cell |
| 101A, 101B, 102A, 102B, 103, 104 | Supercapacitors |
| 110, 120 | Electrodes |
| 140 | Isolator |
| 200 | Cell |
| 201A, 201B, 202A, 202B, 203A, 203B | Supercapacitors |
| 210, 220, 230 | Electrodes |
| 300 | Cell |
| 301A, 301B, 302A, 302B, 303, 304 | Supercapacitors |
| 310, 320 | Electrodes |
| 401 | Supercapacitor apparatus |
| 401 | Supercapacitor |
| 402, 403 | Electrodes |
| 404 | Electrolyte solution |
| 410 | Isolator |

While the invention has been shown and described with reference to certain embodiments of the present invention thereof, it will be understood by those skilled in the art that various changes in from and details may be made therein without departing from the spirit and scope of the present invention and equivalents thereof.

Having described the present invention including various features and variations thereof, it is intended that the appended claims be interpreted as including the embodiments described herein, any alternatives mentioned above, and all equivalents thereto.

What is claimed is:

1. A supercapacitor apparatus, comprising:
a first cell including at least first and second supercapacitors, the first and second supercapacitors of the first cell representing a pair of supercapacitors and having a common electrode;
a second cell including at least first and second pairs of supercapacitors, one of the supercapacitors of the first pair of the second cell and one of the supercapacitors of the second pair of the second cell having a common electrode;
the first cell stacked on the second cell and interconnected in a manner in which:
the first pair of supercapacitors of the second cell and the first supercapacitor of the first cell have a common electrode, and
the second pair of supercapacitors of the second cell and the second supercapacitor of the first cell have a common electrode; and
wherein each of the electrodes of the supercapacitors comprises a nano-carbon composite of graphene platelets with carbon nanotubes.

2. The supercapacitor apparatus of claim 1, wherein:
each of the supercapacitors of the first pair of the second cell are disposed adjacent to one another, each of the supercapacitors of the second pair of the second cell are disposed adjacent to one another, and
the supercapacitor of the first pair of the second cell and the supercapacitor of the second pair of the second cell having a common electrode are adjacent to each other.

3. The supercapacitor apparatus of claim 1, wherein the first cell includes third and fourth supercapacitors,
the third supercapacitor of the first cell having an electrode in common with the common electrode of the first pair of supercapacitors of the second cell and the first supercapacitor of the first cell,
the fourth supercapacitor of the first cell having an electrode in common with the common electrode of the second pair of supercapacitors of the second cell and the second supercapacitor of the first cell.

4. The supercapacitor apparatus of claim 1, wherein the first cell includes a second pair of supercapacitors disposed adjacent to the first pair of supercapacitors of the first cell, the second pair of supercapacitors of the first cell having a common electrode, and one of the supercapacitors of the second pair of the first cell having an electrode in common with said common electrode of the second pair of supercapacitors of the second cell and the second supercapacitor of the first cell.

5. The supercapacitor apparatus of claim 1, further comprising a third cell including at least first and second supercapacitors, the first and second supercapacitors of the third cell representing a pair of supercapacitors and having a common electrode that is in common with the common electrode of said one of the supercapacitors of the first pair of the second cell and said one of the supercapacitors of the second pair of the second cell.

6. The supercapacitor apparatus of claim 5, wherein the supercapacitors of the third cell are intra-connected in a manner identical to the intra-connection of the supercapacitor of the first cell.

7. The supercapacitor apparatus of claim 1, wherein the supercapacitors of the first cell and the supercapacitors of the second cell are interconnected in a mirror configuration.

8. The supercapacitor apparatus of claim 1, wherein the supercapacitor apparatus, during operation, is internally balanced and does not require active, external balancing.

9. The supercapacitor apparatus of claim 1, wherein the supercapacitor apparatus does not include balancing resistors.

10. The supercapacitor apparatus of claim 1, further comprising at least third and fourth cells each including a plurality of supercapacitors, in which the supercapacitors of the third cell are interconnected with the supercapacitors of the second cell, and the supercapacitors of the fourth cell are interconnected with the supercapacitors of the third cell, and wherein the interconnections are configured to provide a stand-off voltage of the supercapacitor apparatus of at least 10 volts.

11. The supercapacitor apparatus of claim 1, wherein the supercapacitor apparatus includes at least eight cells, each of the cells having a plurality of supercapacitors, and in which each cell is interconnected with an adjacent cell in a manner configured to provide a stand-off voltage of the supercapacitor apparatus of at least 20 volts.

12. The supercapacitor apparatus of claim 1, wherein each of the electrodes of the supercapacitors further comprises the nano-carbon composite disposed on a conductive metal foil.

13. The supercapacitor apparatus of claim 1, wherein the nano-carbon composite comprises carbon nanotubes and graphene nanoplatelets at a ratio of 50:50.

14. The supercapacitor apparatus of claim 1, wherein each of the electrodes of the supercapacitors are adapted to exhibit a capacitance density of at least 200 F/g.

15. The supercapacitor apparatus of claim 1, further comprising a housing and wherein each of the cells are sealed within the housing to provide a sealed high-voltage supercapacitor energy storage unit with internal balancing.

16. The supercapacitor apparatus of claim 15, wherein external connection to the cells sealed within the housing is only through positive and negative terminals of the housing.

17. A supercapacitor apparatus, comprising:
a plurality of cells stacked on one another, each of the cells including a plurality of supercapacitors, the cells and the supercapacitors therein are in a parallel-series configuration to provide an internally balanced supercapacitor apparatus that has a stand-off voltage of at least 10 volts; and
wherein electrodes of the supercapacitors comprise a nano-carbon composite of graphene platelets with carbon nanotubes.

18. The supercapacitor apparatus of claim 17, wherein the supercapacitor apparatus is configured to not require balancing resistors or external balancing circuitry to remain balanced during operation.

19. The supercapacitor apparatus of claim 17, wherein each of the electrodes of the supercapacitors further comprises the nano-carbon composite disposed on a conductive metal foil.

20. A supercapacitor apparatus, comprising:
a plurality of cells, each of the cells having a plurality of pairs of supercapacitors, each of the supercapacitors within each of the cells interconnected to one or more supercapacitors within the same respective cell and to one or more supercapacitors in one or more adjacent cells, the interconnection of the supercapacitors representing a parallel-series configuration; and
wherein electrodes of the supercapacitors comprise a nano-carbon composite of graphene platelets with carbon nanotubes.

21. The supercapacitor apparatus of claim 20, wherein the supercapacitors interconnected in the parallel-series configuration are configured to provide an internally balanced supercapacitor apparatus having a stand-off voltage of at least 10 volts.

* * * * *